United States Patent
Thomlinson et al.

(10) Patent No.: US 6,272,631 B1
(45) Date of Patent: *Aug. 7, 2001

(54) PROTECTED STORAGE OF CORE DATA SECRETS

(75) Inventors: Matthew W. Thomlinson, Bellevue; Scott Field, Renton; Allan Cooper, Bellevue, all of WA (US)

(73) Assignee: Microsoft Corporation, Redmond, WA (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/884,864

(22) Filed: Jun. 30, 1997

(51) Int. Cl.[7] .............................. G11C 11/00; H04K 1/00
(52) U.S. Cl. ..................... 713/155; 713/165; 713/182; 713/183; 713/185; 713/186; 713/193
(58) Field of Search ................................ 380/45, 49, 25, 380/39; 713/155, 165, 182, 183, 185, 186, 193

(56) References Cited

U.S. PATENT DOCUMENTS

| | | | |
|---|---|---|---|
| 4,933,969 | * 6/1990 | Marshall et al. | 380/25 |
| 5,495,533 | * 2/1996 | Linehan et al. | 380/21 |

(List continued on next page.)

FOREIGN PATENT DOCUMENTS

| | | | |
|---|---|---|---|
| 0 442 839 A3 | 1/1991 | (EP) | G06F/1/00 |
| 0 456 386 A2 | 4/1991 | (EP) | G06F/1/00 |
| 0 717 339 A2 | 11/1995 | (EP) | G06F/1/09 |
| 0 820 017 A2 | 3/1997 | (EP) | G06F/12/14 |

OTHER PUBLICATIONS

Korth, Henry K. and Silberschatz, Abraham, "Database System Concepts, Second Edition", McGraw–Hill, Inc., pp 3–5 and 15, Jan. 1991.*
"Signing Code with Microsoft's Authenticode Technology," date unknown.

*Primary Examiner*—James P. Trammell
*Assistant Examiner*—James W. Myhre
(74) *Attorney, Agent, or Firm*—Lee & Hayes, PLLC

(57) ABSTRACT

The invention provides central storage for core data secrets, referred to as data items. The architecture includes a storage server, a plurality of installable storage providers, and one or more authentication providers. Programming interfaces are exposed so that application programs can utilize the services provided by the invention without having to actually implement the features. When storing a data item using the protected storage services, an application program can specify rules that determine when to allow access to the data item. Access can, if desired, be limited to the current computer user. Access can similarly be limited to specified application programs or to certain classes of application programs. The storage server authenticates requesting application programs before returning data to them. A default authentication provider authenticates users based on their computer or network logon. A default storage provider allows storage of data items on magnetic media such as a hard disk or a floppy disk. Data items are encrypted before they are stored. The encryption optionally uses a key that is derived from the previous authentication of the user. Specifically, the key is derived from the user's password, supplied during logon. In addition, an application program or the user can specify that certain items require another password that is entered whenever access to the data is requested. The default storage provider implements a multi-level encryption scheme to minimize the amount of encryption that has to be re-done when the user changes a password. Each data item is encrypted using an item key that is generated randomly by the system. The item key is in turn encrypted with a master key that is itself encrypted with a key derived from the user-supplied password (such as the user's logon password).

45 Claims, 3 Drawing Sheets

U.S. PATENT DOCUMENTS

| | | | |
|---|---|---|---|
| 5,509,074 | * 4/1996 | Choudhury et al. | 380/23 |
| 5,530,758 | * 6/1996 | Marino, Jr. et al. | 380/49 |
| 5,555,304 | * 9/1996 | Hasebe et al. | 380/4 |
| 5,870,477 | * 2/1999 | Sasaki et al. | 380/25 |

* cited by examiner

PROTECTED STORAGE OF CORE DATA SECRETS

TECHNICAL FIELD

This invention relates to systems and methods that provide central services for securely storing core data secrets such as passwords, cryptographic keys, and sensitive personal or financial codes.

BACKGROUND OF THE INVENTION

Increasingly, financial and other sensitive transactions are being performed by personal computers. This has increased the need for secure storage of data. Modem cryptography techniques are often used to protect such data from unauthorized access.

New security methods, however, have brought about a need to store and protect "core" data secrets, such as private cryptographic keys, credit card numbers, and other small pieces of secret data. Presently, this responsibility is left to individual application programs or to personal computer users themselves. Although programs are available that allow users to encrypt and store data, such programs cannot typically be used by other application programs. Currently, each application program has to devise a safe and secure method to store such data.

As an example of the problems associated with the current state of the art, consider the issues involved in exploiting smart card technologies. A smart card is particularly well suited as a receptacle for core data secrets such as those described above. In addition, smart cards can be used to authenticate users by requiring each user to insert his or her personal smart card into a receptacle associated with the user's personal computer. Tamper-proof smart cards have been designed for just these purposes.

Problems arise without agreed-upon standards for using such devices. Although a developer could provide capabilities for working with a limited number of smart cards, it would be difficult or impossible to anticipate all the different variations that might eventually arise. This fact makes it impractical to implement smart card technology in various different applications.

Although some storage media such as magnetic hard disks do not present the challenges of smart cards, many software developers simply do not have the background and knowledge required to safely implement modern cryptographic techniques. Even if they did, it would be inefficient for each developer to undertake the complex task of developing a method of storing core secrets. Furthermore, resulting solutions would be incompatible. It would be much more preferable to adopt a common scheme for storing such data, and to avoid having to implement a new solution for every different application program.

SUMMARY OF THE INVENTION

The invention described below provides central protected storage services that can be called by application programs to store core secrets. An embodiment of the invention is implemented as a server process and associated interfaces that can be invoked by application programs to store and retrieve small data items.

The general method and architecture includes a storage server and a plurality of installable storage providers and authentication providers. Each storage provider is adapted to securely store data using a specific type of media, such as magnetic media or smart cards. Details of the storage medium are hidden from the calling application programs. Authentication providers are used to authenticate users by different methods, such as by requesting passwords, by reading smart cards, by retinal scans, or by other ways that might be devised in the future. Again, authentication details are generally hidden from the calling application programs.

Application programs interact with the storage server through well-defined interfaces. A data item can be stored with a simple call to the storage server, and can be retrieved later with a similar call. All encryption, decryption, item integrity checks, and user authentication are performed by the storage server and its associated providers. Because of this, application programs can take advantage of advanced security features without adding complexity to the application programs themselves.

When storing a data item using the protected storage services, an application program can specify rules that determine when to allow access to the data item. Access is generally limited to the computer user that created the data item. Access can similarly be limited to specified application programs or to certain classes of application programs. The storage server authenticates requesting application programs before returning data to them.

A default authentication provider authenticates users based on their computer or network logon. Other authentication providers can also be installed.

A default storage provider allows storage of data items on magnetic media such as a hard disk or a floppy disk. Data items are encrypted before they are stored. The encryption uses a key that is derived from the authentication of the user. Specifically, the key is derived from the user's password, supplied during computer or network logon. In addition, an application program or the user can specify that certain items require an additional password to be entered whenever access to the data is requested.

The default storage provider implements a multi-level key encryption scheme to minimize the amount of encryption that has to be re-done when the user changes a password. Each data item is encrypted using an item key that is generated randomly by the system. The item key is in turn encrypted with a master key that is itself encrypted (as described below) with a key derived from the user-supplied password (such as the user's logon password).

DETAILED DESCRIPTION

Cryptography Overview

Figure 1:
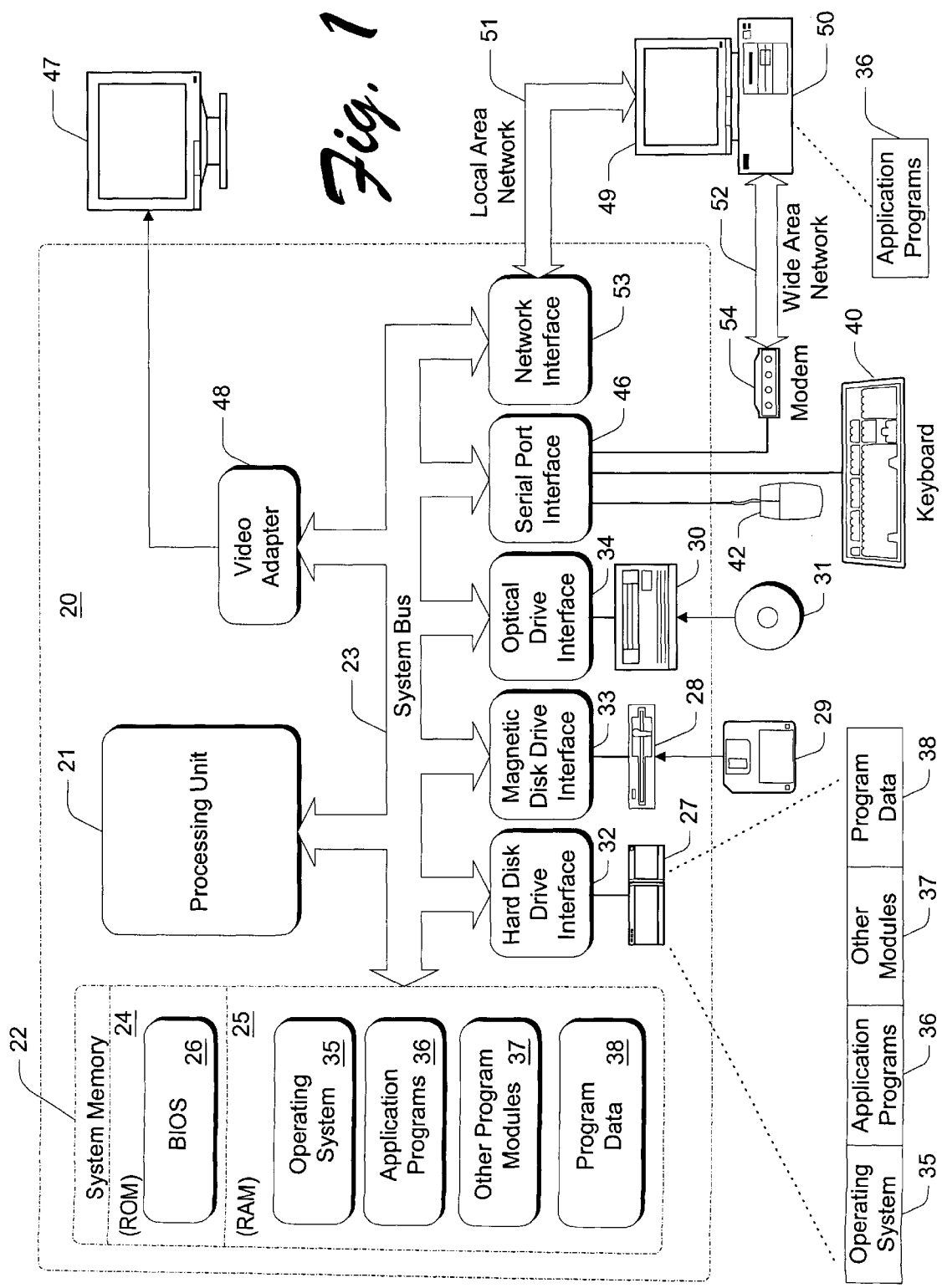
FIG. 1 is a block diagram of an exemplary computer system suitable for use in implementing the invention.

In general, cryptography is the process for encrypting or scrambling messages such that the messages can be stored and transmitted securely. Cryptography can be used to achieve secure communications, even when the transmission media (for example, the Internet) is untrustworthy. Computer users also use cryptography to encrypt sensitive files, so that an intruder cannot understand them. Cryptography can be used to ensure data integrity as well as to maintain secrecy. It is also possible to verify the origin of data items using cryptography, though the use of using digital signatures. When using cryptographic methods, only the cryptographic keys must remain secret. The algorithms, the key sizes, and file formats can be made public without compromising security.

Using data encryption, a data item can be scrambled so that it appears like random gibberish and is very difficult to transform back to the original data without a secret key. This message can consist of ASCII text, a database file, or any other data.

Once a data item has been encrypted, it can be stored on non-secure media or transmitted over a non-secure network, and still remain secret. Later, the message can be decrypted into its original form.

When a data item is encrypted, an encryption key is used. This is comparable to a key that is used to lock a padlock. To decrypt the message, a decryption key must be used. The encryption and decryption keys are often, but not always, the same key.

There are two main classes of encryption algorithms: symmetric algorithms and public-key algorithms (also known as asymmetric algorithms). Systems that use symmetric algorithms are sometimes referred to as conventional.

Symmetric algorithms are the most common type of encryption algorithm. They are known as symmetric because the same key is used for both encryption and decryption. Unlike the keys used with public-key algorithms, symmetric keys are frequently changed.

Compared to public-key algorithms, symmetric algorithms are very fast and, thus, are preferred when encrypting large amounts of data. Some of the more common symmetric algorithms are RC2, RC4, and the Data Encryption Standard (DES).

Public-key (asymmetric) algorithms use two different keys: the public key and the private key. The private key is kept private to the owner of the key pair, and the public key can be distributed to anyone who requests it (often by means of a certificate). If one key is used to encrypt a message, then the other key is required to decrypt the message.

Public-key algorithms are very slow—on the order of 1,000 times slower than symmetric algorithms. Consequently, they are typically used only to encrypt session keys. They are also used to digitally sign messages.

One of the most common public-key algorithms is the RSA Public-Key Cipher.

Digital signatures can be used to distribute an unencrypted data item, while allowing the recipients to be able to verify that the message comes from its purported sender and that it has not been tampered with. Signing a message does not alter the message, it simply generates a digital signature string that can either is be bundled with the message or transmitted separately.

Digital signatures are generated by using public-key signature algorithms: a private key is used to generate the signature, and the corresponding public key is used to validate the signature.

Authentication involves the process of verifing the identity of a person or entity. Certificates are a common way to achieve authentication. A certificate is a set of data that completely identifies an entity, and is issued by a Certification Authority (CA) only after that Authority has verified that the entity is who it says it is. The data set includes the entity's public cryptographic key. When the sender of a message signs data with its private key (and sends a copy of its certificate with the message), the recipient of the message can use the sender's public key (retrieved from the certificate) to verify that the sender is who it says it is. Certificates can also be used to verify that data (including application programs) have been vouched for by a trusted source.

On a network, there is often a trusted application running on a secure computer that is known as the Certification Authority. This application knows the public key of each user. Certification Authorities dispense messages known as certificates, each of which contains the public key of one of its client users. Each certificate is signed with the private key of the Certification Authority.

The invention described below utilizes techniques such as the well-known digital encryption, signing, and authentication techniques described above. For further information regarding such techniques, refer to Schneier, Bruce; *Applied Cryptography Second Edition: Protocols, Algorithms, and Source Code in C*; John Wiley & Sons, 1996, which is hereby incorporated by reference. The following discussion assumes general familiarity with these topics.

Exemplary Operating Environment

FIG. 1 and the following discussion are intended to provide a brief, general description of a suitable computing environment in which the invention may be implemented. Although not required, the invention will be described in the general context of computer-executable instructions, such as program modules, being executed by a personal computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, network PCs, minicomputers, mainframe computers, and the like. The invention may also be practiced in distributed computer environments where tasks are performed by remote processing devices that are linked through a communications network. In a distributed computer environment, program modules may be located in both local and remote memory storage devices.

With reference to FIG. 1, an exemplary system for implementing the invention includes a general purpose computing device in the form of a conventional personal computer 20, including a processing unit 21, a system memory 22, and a system bus 23 that couples various system components including the system memory to the processing unit 21. The system bus 23 may be any of several types of bus structures including a memory bus or memory controller, a peripheral bus, and a local bus using any of a variety of bus architectures. The system memory includes read only memory (ROM) 24 and random access memory (RAM) 25. A basic input/output system 26 (BIOS), containing the basic routines that help to transfer information between elements within personal computer 20, such as during start-up, is stored in ROM 24. The personal computer 20 further includes a hard disk drive 27 for reading from and writing to a hard disk, not shown, a magnetic disk drive 28 for reading from or writing to a removable magnetic disk 29, and an optical disk drive 30 for reading from or writing to a removable optical disk 31 such as a CD ROM or other optical media. The hard disk drive 27, magnetic disk drive 28, and optical disk drive 30 are connected to the system bus 23 by a hard disk drive interface 32, a magnetic disk drive interface 33, and an optical drive interface 34, respectively. The drives and their associated computer-readable media provide nonvolatile storage of computer readable instructions, data structures, program modules and other data for the personal computer 20. Although the exemplary environment described herein employs a hard disk, a removable magnetic disk 29 and a removable optical disk 31, it should be appreciated by those skilled in the art that other types of computer readable media which can store data that is accessible by a computer, such as magnetic cassettes, flash memory cards, digital video disks, Bernoulli cartridges, random access memories (RAMs) read only memories (ROM), and the like, may also be used in the exemplary operating environment.

A number of program modules may be stored on the hard disk, magnetic disk 29 optical disk 31, ROM 24, or RAM 25, including an operating system 35, one or more application programs 36, other program modules 37, and program data 38. A user may enter commands and information into the personal computer 20 through input devices such as keyboard 40 and pointing device 42. Other input devices (not shown) may include a microphone, joystick, game pad, satellite dish, scanner, or the like. These and other input devices are often connected to the processing unit 21 through a serial port interface 46 that is coupled to the system bus, but may be connected by other interfaces, such as a parallel port, game port, or a universal serial bus (USB). A monitor 47 or other type of display device is also connected to the system bus 23 via an interface, such as a video adapter 48. In addition to the monitor, personal computers typically include other peripheral output devices (not shown) such as speakers and printers.

The personal computer 20 may operate in a networked environment using logical connections to one or more remote computers, such as a remote computer 49. The remote computer 49 may be another personal computer, a server, a router, a network PC, a peer device or other common network node, and typically includes many or all of the elements described above relative to the personal computer 20, although only a memory storage device 50 has been illustrated in FIG. 1. The logical connections depicted in FIG. 1 include a local area network (LAN) 51 and a wide area network (WAN) 52. Such networking environments are commonplace in offices, enterprise-wide computer networks, intranets, and the Internet.

When used in a LAN networking environment, the personal computer 20 is connected to the local network 51 through a network interface or adapter 53. When used in a WAN networking environment, the personal computer 20 typically includes a modem 54 or other means for establishing communications over the wide area network 52, such as the Internet. The modem 54, which may be internal or external, is connected to the system bus 23 via the serial port interface 46. In a networked environment, program modules depicted relative to the personal computer 20, or portions thereof, may be stored in the remote memory storage device. It will be appreciated that the network connections shown are exemplary and other means of establishing a communications link between the computers may be used.

The illustrated computer uses an operating system such as the Windows family of operating systems available from Microsoft Corporation. The functionality described below is implemented using standard programming techniques, including the use of OLE and COM interfaces such as described in Brockschmidt, Kraig; *Inside OLE*2; Microsoft Press, 1994, which is hereby incorporated by reference.

More recent Windows operating systems utilize what is referred to as the Win32 API: a well-defined set of interfaces that allow application programs to utilize functionality provided by the Windows operating systems. The Win32 API is documented in numerous texts, including Simon, Richard; *Windows*95 *Win*32 *Programming API Bible*; Waite Group Press, 1996, which is hereby incorporated by reference. General familiarity with this type of programming is assumed throughout the following discussion.

Overall Functionality and Architecture

Figure 2:
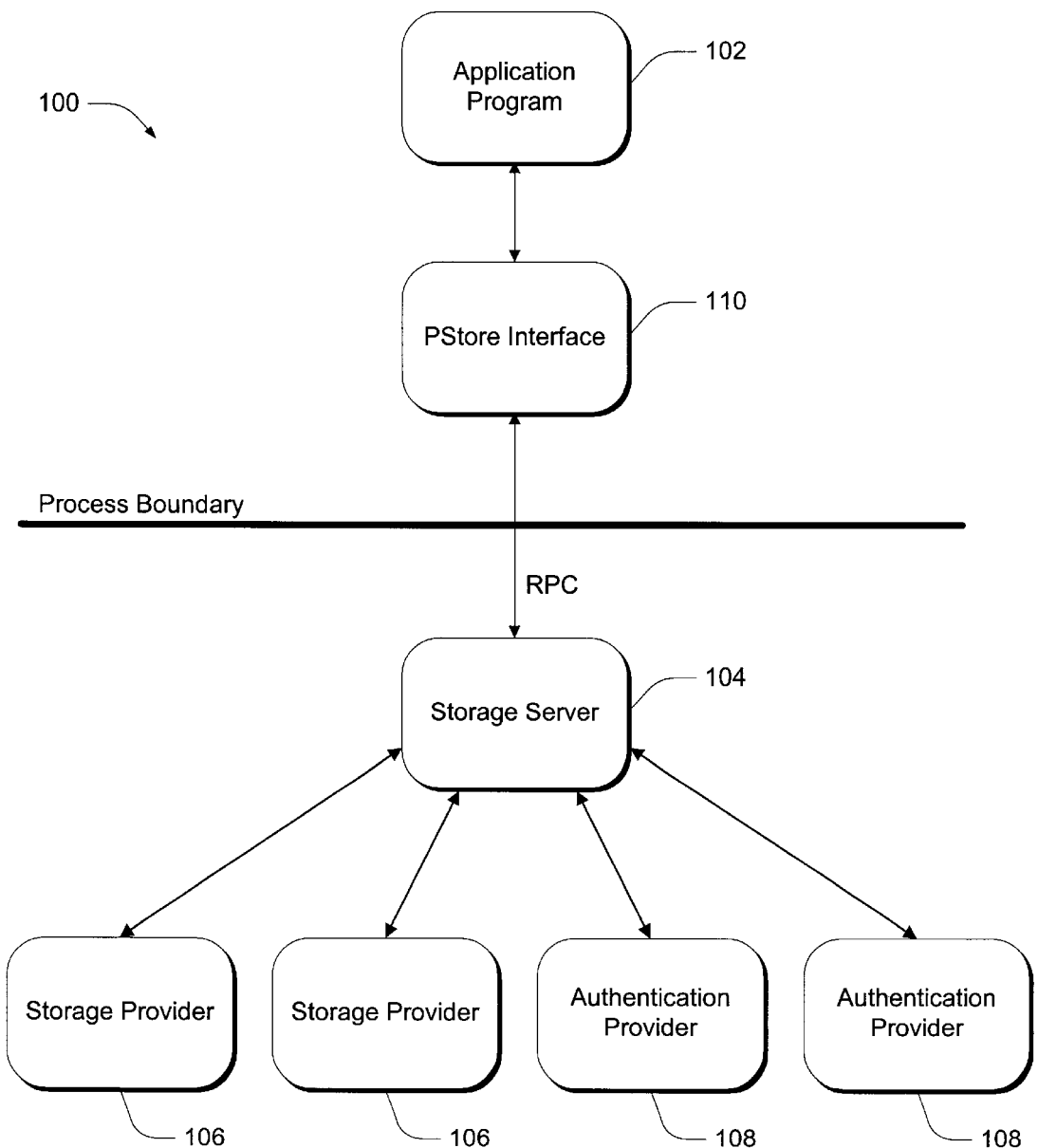
FIG. 2 is a block diagram of a protected storage system and a calling application program in accordance with the invention.

FIG. 2 shows architectural components of a protected storage system in accordance with the invention for storing data items and for protecting them from unauthorized access. The protected storage system allows application programs to securely store data items that must be kept private and free from tampering. Such data items might include cryptographic keys, passwords, financial information, trust profiles, etc. The storage system is designed to hold small items of core secret data in a central and common storage location; if a lot of data is to be protected, a bootstrap secret (such as an encryption key) may be stored in the storage system rather than the data itself. This enables data items to be moved when appropriate to small, secure hardware devices such as smart cards, and also avoids unnecessary overhead which would otherwise be required to secure large data items.

The protected storage system is executed by a computer such as described above with reference to FIG. 1. Application programs, such as application program 102 shown in FIG. 2, are also executed by the computer.

Storage system 100 includes a storage server component 104, also referred to as a dispatcher. Generally, the storage server, through the Pstore interface 110, receives data items from application programs, securely stores the data items, and returns such data items in response to requests from application programs. The storage server also performs authentication and verification procedures with respect to the requesting application programs, as will be explained in more detail below.

Associated with the storage server are a plurality of installable storage providers 106 and a plurality of installable authentication providers 108. Specified storage providers are called by the storage server to securely store and retrieve data items. One or more authentication providers are called by the storage server to identify and/or authenticate current computer users.

A default storage provider is implemented within the storage system. The default storage provider encrypts data items and then stores them on a hard disk or floppy disk. The encryption is based on one or more keys that are derived from authentication of the current computer user. The default storage provider also verifies the integrity of data items when retrieving and decrypting them.

A default authentication provider is also implemented within the storage system. The default authentication provider is called by the storage server to identify current computer users based on previously completed operating system logon procedures. Specifically, the default authentication provider identifies the current computer user based on the logon identification and password provided by the user while logging on to the computer's operating system or to a network operating system.

Although default storage and authentication providers are implemented, additional providers can be installed in the future to take advantage of new storage and authentication technologies. For example, a smart card storage provider might be installed to allow storage of core data items on a smart card. A smart card authentication provider might similarly be provided to authenticate users by requiring them to insert their smart cards into a smart card reader. In either case, the smart card could utilize public-key cryptographic techniques.

Well-defined COM interfaces are used between the storage server and the various providers, allowing new providers to be easily installed and registered with the storage server. Application programs are able to make the same calls to storage server 104 regardless of which providers are used. Because of this, application programs can be written to take advantage of future technologies by simply interacting with storage server 104, and without having to concern themselves with the details of such future technologies.

To increase security, the protected storage system is implemented in a different address space than the calling application programs. Communications across the process or address space boundary take place using remote procedure calls (RPCs). Such calls can be made when operating under Windows operating systems and other operating systems. The functionality and formatting of RPC calls is documented in the Microsoft Win32 Software Development Kit.

Although application programs can make RPC calls directly, this complexity is avoided by providing a dynamically linked library (DLL) that can be executed in the application programs' address spaces. This library, referred to as Pstore Interface 110 in FIG. 2, implements a plurality of interfaces and associated methods that can be called by the application programs to exploit the full functionality of the protected storage system. The interfaces include methods for creating and reading data items, as well as other useful functions as described in a following section entitled "Application Interface Functions." The interfaces and methods in the described embodiment are implemented using the COM (component object model) interfaces of the Windows operating system.

Protected-Data Access Control

The protected storage system described herein has powerful data access control capability. The storage system offers two levels of data protection: application-level protection and user-level protection. At the application level, the storage server returns requested data items only to authorized requesting application programs. Furthermore, the storage server authenticates requesting application programs before returning individual data items. Application program authentication refers to a process of determining whether an application program has been tampered with, or to an alternative process of verifying a program's trustworthiness through use of public/private key cryptographic digital signatures or other means. Microsoft Authenticode is an available mechanism for verifying, through the use of digital signatures, that an application program has been published by a specified person, group, or organization, and that it is therefore trustworthy. Authenticode functionality is publicly available from Microsoft Corporation as part of its Win32 Software Development Kit.

In the embodiment describe herein, data items are organized in a hierarchical fashion by specifying types and subtypes as follows:

Type—Subtype—Data Item

There are predefined types and subtypes, and application programs can create new types and subtypes. Different protection levels can be established for data items falling under certain types and subtypes. Specifically, an access rule set is specified for each subtype. An access rule set contains rules for different types or subtypes of data items. Access to a data item of a particular subtype is granted if any single rule of the corresponding rule set is satisfied. Each access rule comprises a mode and one or more access clauses; all of the access clauses must be satisfied before the rule is considered satisfied. The mode indicates the type of access allowed if all the clauses in a rule are satisfied. Currently, there are two access modes defined: read and write access.

There are currently three types of access clauses: Authenticode, Binary Check, and Security Descriptor. Authenticode verifies the application program requesting access to the protected data is trusted and can optionally determine whether the originator, and thus the originator's application, can be trusted. Binary Check ensures that a program has not been tampered with since installation. The Security Descriptor clause provides access based on Windows NT access control lists (ACLs).

Authenticode is a well-documented product and service available from Microsoft Corporation. If the Authenticode clause was specified at the time of subtype creation, a check is made to see if the requesting application was signed or not, and if signed, by whom. The clause may specify a particular root, certificate issuer, publisher (signer), program name, or some combination of the foregoing. Access will not be granted unless the specified criteria are met. If no criteria are specified, the verification amounts to allowing any Authenticode-verified application or module access to the data. Authenticode checking also verifies the binary image of the module under inspection.

The Binary Check is implemented by taking a hash of a binary image of an application program at initialization. When the application program asks for data at a later time, the storage system again takes a hash of the memory image and compares it to the original hash. The two hashes must match before the protected storage system will allow the application program to access requested data. Thus, if the application has changed since it was installed, and therefore is likely to have been tampered with, the data will be protected and access to the data by the application will be denied.

The Security Descriptor clause is intended to allow access only to specified users or groups, and is enforced on Windows NT platforms. This clause gets the necessary information about the users and groups from the ACLs contained in the Windows NT security descriptor.

At the user level, the storage server allows access to individual data items depending on the current computer user; by default, only the user responsible for creating the data item is allowed to access it. However, a user can override this default behavior by specifying appropriate options when creating and saving data items, or the user can later modify access rights to the data.

Users and application programs can specify security styles, which specify a degree and/or type of configuration or authentication is required to access a particular data item; for instance, whether a password is required. The current embodiment, with the default authentication provider, supports the following access styles:

Silent access: no user interaction required. Authentication is based on a previously completed computer or network operating system authentication procedure. In most cases, this type of authentication relies on the user being able to enter the correct password during a previous logon procedure, and no further interaction is required when protected data is actually accessed.

Logon password: a dialog box is presented requiring the user to enter the password previously used to logon to the computer or network. p1 User-defined password: the user specifies a password when an item is initially stored, and must enter the password before the data can be accessed again. Such passwords can be different for different data items, or groups of data items can be stored under the same password.

OK/cancel: when an application attempts to access the data, a dialog box appears. The user responds to the dialog box by clicking on an OK or deny button, thereby granting/denying access to the data by a requesting application program.

As is apparent from the different types of access styles, accessing items in protected storage may require user interaction. This interaction is implemented through the use of a user alert dialog box. Typically, the user will be required to enter a password in response to a user alert dialog box. However, different authentication providers might require different types of responses (such as physical insertion of a hardware token or biometric authentication procedures).

To prevent attacking programs from presenting similar user alert dialogs, and thereby gaining access to secret data, the user alert dialogs can be customized by the user. Specifically, a user can specify a particular background or digital watermark to be used in the user alert dialog box. Alternatively, such a watermark can be randomly generated for the user. The user will become familiar with whatever watermark has been selected, and will thus recognize unauthorized dialog boxes generated by attacking applications.

Data Encryption, Decryptions and Authentication

Different storage providers may protect stored data in different ways. However, some type of cryptography will usually be employed. The default storage provider described herein uses a password-based encryption scheme, wherein data items are encrypted based on a user-supplied password, or some other code related to user authentication, before storing the data items. When retrieving the data items, decryption is based on the same password or code.

When a data item is protected by the "user-defined password" security style mentioned above, the user explicitly enters a password for each data item during an authentication step that is invoked prior to allowing access to an individual data item. In the case of "silent access," however, encryption and decryption are based on a password or other code that is supplied by the current computer user during a previous computer or network operating system authentication or logon procedure. Typically, a user's logon name and password are used to form or derive a key that is used for encrypting and decrypting data items.

Figure 3:
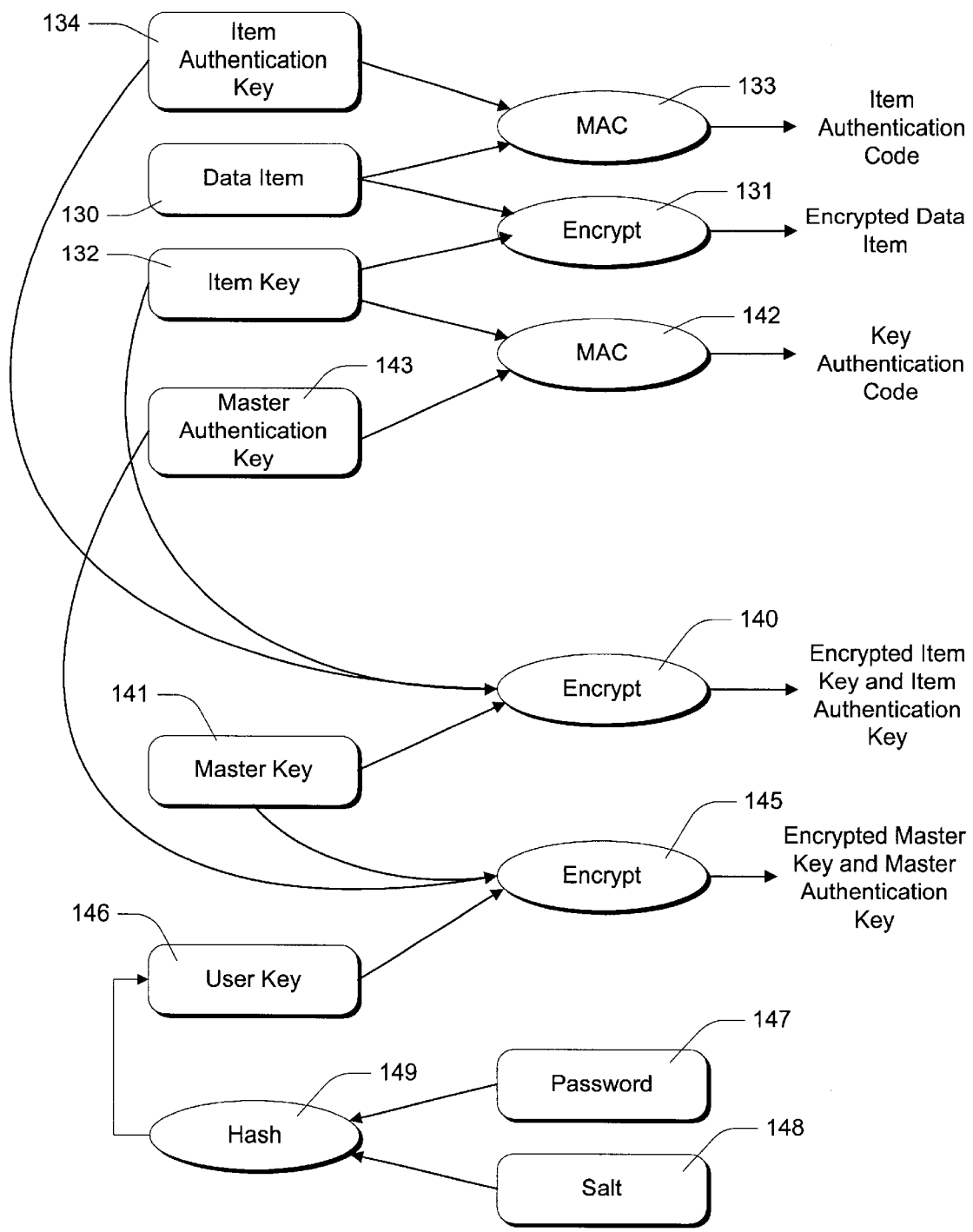
FIG. 3 is a process diagram illustrating how data items are encrypted and authenticated in accordance with the invention.

In the described embodiment, a multi-level key technique is used to encrypt data items based on user-supplied codes or passwords. This technique is illustrated in FIG. 3. In this implementation, encryption and decryption use one or more keys that are derived from the supplied passwords or logon codes. As mentioned, the password or code can either be gathered from a previous authentication step, or the storage system might prompt the current computer user for a password.

Generally, an item key is randomly generated for each data item. The data item is encrypted with its corresponding item key. An item authentication key is also generated randomly for each item and is used to generate an item authentication code. Item authentication codes are used during decryption to verify that data items are decrypted correctly.

The item key and item authentication key are then encrypted using a master key. The master key is a randomly generated number. A master authentication key is also generated and used to calculate a key authentication code so that the correct decryption of the item key and item authentication key can be verified later. Finally, the master key and master authentication key are encrypted using a password that is derived from user authentication or identification.

With reference now to the specific steps of FIG. 3, an individual data item that is to be encrypted and stored is referenced by numeral 130. A step or operation 131 is performed of encrypting data item 130 using an item key 132. Specifically, cryptographic key 132 is used to perform a DES encryption on data item 130. Item key 132 is generated as a random number by the default storage provider.

The storage provider also performs a step 133 of generating an item authentication code for individual data item 130. The item authentication code is generated using a MAC (message authentication code) in conjunction with a randomly generated item authentication key 134. MACs are described in the is Schneier text mentioned above.

A further step 140 is performed of encrypting the item key 132 and the item authentication key 134 with a master key 141, again using the DES encryption mentioned above. The master key is a random number. A step 142 comprises generating a key authentication code for the combination of the item key and the item authentication key. The key authentication code is generated with a MAC in conjunction with a randomly generated master authentication key 143.

A step 145 is performed of encrypting the master key and the master authentication key with a user key 146. This is again a DES encryption.

The user key is derived from the user-supplied password or code, referenced in FIG. 3 by numeral 147. To generate the user key, the user-supplied password 147 is appended to a random number referred to as a salt 148, and hashed in a step 149 using an SHA-1 hashing function. This results in a number that is used as the user key.

Once these steps are performed, the storage server stores the encrypted individual data item, the item authentication code, the encrypted item key, the encrypted item authentication key, the key authentication code, the encrypted master key, and the encrypted master authentication key, to be retrieved later when requested by an authorized application program.

Retrieval comprises the reverse process. The encrypted items are retrieved from storage. The storage provider derives the user key from the user-supplied password and uses the user key to decrypt the master key and master authentication key. The master authentication key is used in conjunction with the specified MAC to verify that the master key decrypted correctly. The master key is then used to decrypt an appropriate item key and corresponding item authentication key. The item authentication key is used in conjunction with the MAC to verify that the item key decrypted correctly. The item key is then used to decrypt the actual data item.

This process allows all of a user's data items to be controlled by a single master key that is in turn encrypted as a function of the user's password. The advantage of this scheme is that data items do not have to be re-encrypted when the user changes his or her password. Rather, only the master key needs to be encrypted again.

Verification of Storage System Integrity

The storage server, the storage providers, and the authentication providers employ a security interlock mechanism to prevent security violations that might result from tampering with system components. This mechanism utilizes cryptographic techniques.

One motivation for the security interlock mechanism is to prevent non-authorized providers from being loaded by the storage server. It is particularly important to prevent a non-authorized module from masquerading as an authorized provider, since such a non-authorized module could steal secret data from the system. Another motivation is to prevent tampering with the storage server itself.

When the server and providers are shipped, they are digitally signed with the private key of a public/private cryptographic key pair-the private key has a corresponding public key. The public key is then hard-coded into the various modules of the server and providers. The server and the providers are configured to verify each others' signatures using the public cryptographic key whenever an individual component is loaded and executed. When the server is loaded, it first checks its own integrity by checking its own digital signature with the public key. The server then checks the digital signatures of other core components as they are loaded. As each component is loaded, it checks the digital signature of the server. If any integrity check fails, none of the components will operate.

Authentication of Requesting Application Programs

As discussed above, access to data items can be restricted based on which application programs are trying to access the data items. For this feature to be reliable, the storage system needs to verify that application programs are who they say they are, and that they have not been tampered with. This process is referred to as program authentication. One option is to authenticate programs based on a binary check. Such an authentication is performed by two storage server modules: the identification module and the enforcement module.

The identification module is responsible for interrogating the client that is calling the storage server. In order to identify a process associated with a request, the following steps occur:

1. The client application program identifies itself to the server, presenting two pieces of information: a process ID, and a thread handle. The process ID is obtained using the GetCurrentProcessId( ) system call; the thread handle is obtained using the GetCurrentThread ( ) and DuplicateHandle( ) system calls.
2. The storage server opens a handle to the client, using the process ID in a call to the system call OpenProcess ( ). The storage server saves this handle for later use.
3. The client makes access requests for data items.
4. The server uses the process handle obtained above to analyze the memory address space associated with the client process. The server also uses this handle to query the underlying operating system about what executable modules (.exe, .dll, etc. files) are present in the associated process, in addition to determining module load addresses; the exact method used to query the operating system varies depending on the operating system.
5. The server now has a complete list of modules associated with the client, and uses it to analyze the call stack associated with the thread handle obtained above. The StackWalk( ) system call is utilized to determine the chain of callers associated with the client.

The enforcement module uses results provided by the identification module in performing the following checks:
1. Verifying that the image loaded into the client process has not been tampered with on-disk. This is accomplished by storing a cryptographic representation of the file(s) that are to be granted access. This cryptographic representation is stored alongside the data. There can be two cryptographic representations of the file:

The entire file is read and then subjected to the SHA-1 cryptographic hash. The output of the hash is stored alongside the data. When subsequent access to the data is requested, the hash is recomputed against the on-disk file, and then compared to that stored alongside the data. If these compare correctly, the process continues to check 2, below.

The file is subject to public key certificate-based validation. This uses Microsoft Authenticode calls to verify that the image has not been tampered with. Authenticode handles hashing the disk image internally. This cryptographic representation of the file is more flexible, because it also supports validation against various fields in the certificate attached to the specified file. After the Authenticode verification takes place, the system analyzes the certificate contents, to make sure they match those that were stored alongside the data being accessed.

2. Verifying that the image on disk matches that loaded into the client process.

The module to be checked is "mapped" into the server address space, using the CreateFileMapping( ) and MapViewOfFile( ) system API calls.

Relocation fixups are applied to the mapped image if necessarynly if the image did not load at the preferred address in the client address space.

The system loops over the image header, looking for read-only sections such as code sections, resources, and read-only data. For each section, it updates an SHA-1-based cryptographic hash.

The process handle output from the identification module is now used to read the memory address space where the module is loaded. This is accomplished by using the ReadProcessMemory( ) system call. Each section of memory is read in the manner outlined in the previous step, updating a cryptographic hash as the process proceeds.

The system compares the two hashes resulting from the immediately preceding steps. If they match, the image in memory has not been tampered with.

Application Interface Functions

As described above, interfaces are exposed to application programs so that application programs can take advantage of protected storage features without having to implement sophisticated encryption schemes and without having to make RPC calls. These interfaces and their functions are described in an attached appendix that forms part of this document. These interface and their functions are described immediatly below.

Protected Storage Functions

These functions return pointers to interface objects that are used for accessing and enumerating PStore providers.
The function definitions can be found in pstore.h.

| Functions | Description |
| --- | --- |
| PStoreCreateInstance | Returns a pointer to the IPStore interface. |
| PStoreEnumProviders | Returns a pointer to the IEnumPStoreProviders interface. |

PStoreCreateInstance

This function returns a Protected Storage interface object.
```
HRESULT PStoreCreateInstance(
    IPStore** ppProvider,              // out
    PST_PROVIDERID* pProviderID,       // in
    void* pReserved,                   // in
    DWORD dwFlags                      // in
);
```
Parameters ppProvider
    An indirect pointer to the Protected Storage interface object returned.
pProvider
    Specifies the unique identifier for this provider. NULL specifies the System Provider.
pReserved
    Must be set to NULL.
dwFlags
    The flag values. This parameter is reserved for future use and should be set to zero in the interim to ensure future compatibility.
HRESULT

| Value | Meaning |
| --- | --- |
| PST_E_INVALID_HANDLE | An invalid handle was supplied to the protected storage server. Typically, indicates corruption or invalid handle state managed internally in the COM interface. |
| PST_E_PROV_DLL_NOT_FOUND | Protected storage could not load or locate the specified provider. |
| PST_E_DISK_IMAGE_MISMATCH | Returned when a provider fails an integrity check, and can not be used. Re-install the provider or contact the provider vendor. |
| PST_E_FAIL | Returned if initialization of the provider failed. Typically, indicates a memory allocation failure. |
| PST_E_OK | The method completed successfully. |
| PST_E_SERVICE_UNAVAILABLE | The protected storage service is not running, has not been properly installed, or has been tampered with. Check that protected storage has been installed correctly. |

See Also
IPStore::GetInfo

PStoreEnumProviders

This function returns an enumeration interface object that can be used to enumerate information about all of the installed providers. The information about an individual installed provider is contained in a PST_PROVIDERINFO structure.
```
HRESULT PStoreEnumProviders(
    DWORD dwFlags,                     // in
    IEnumPStoreProviders** ppenum      // out
);
```
Parameters dwFlags
    The flag values. This parameter is reserved for future use and should be set to zero in the interim to ensure future compatibility.
ppenum
    An indirect pointer to the returned enumeration object.
HRESULT

| Value | Meaning |
| --- | --- |
| PST_E_INVALID_HANDLE | An invalid handle was supplied to the protected storage server. Typically, indicates corruption or invalid handle state managed internally in the COM interface. |
| PST_E_PROV_DLL_NOT_FOUND | Protected storage could not load or locate the specified provider. |

-continued

| | |
|---|---|
| PST_E_DISK_IMAGE_MISMATCH | Returned when a provider fails an integrity check, and can not be used. Re-install the provider or contact the provider vendor. |
| PST_E_FAIL | Returned if initialization of the provider failed. Typically, indicates a memory allocation failure. |
| PST_E_OK | The method completed successfully. |
| PST_E_SERVICE_UNAVAILABLE | The protected storage service is not running, has not been properly installed, or has been tampered with. Check that protected storage has been installed correctly. |

Protected Storage Interfaces

Several interface objects are provided for accessing and enumerating PStore providers. The following table lists the interface objects currently available.

| Interface | Description |
|---|---|
| IEnumPStoreItems Interface | Contains methods for enumerating PStore Items. |
| IEnumPStoreProviders Interface | Contains methods for enumerating PStore Providers. |
| IEnumPStoreTypes Interface | Contains methods for enumerating PStore Types and Subtypes. |
| IPStore Interface | Contains methods for managing protected data in the specified PStore provider. |

IEnumPStoreItems Interfaces

This object provides an enumeration interface for items in the Protected Storage area. Items are identified by their LPWSTR name.
The method definitions can be found in pstore.h.
Note that any exceptions thrown internal to these methods are caught and passed back as error codes.

| Methods | Description |
|---|---|
| Clone | Creates another enumerator that contains the same enumeration state as the current one. |
| Next | Retrieves the next specified number of items in the enumeration sequence. |
| Reset | Resets the enumeration sequence to the beginning. |
| Skip | Skips over a specified number of elements in the enumeration sequence. |

IEnumPStoreItems::Clone

Creates another enumerator that contains the same enumeration state as the current one.
HRESULT Clone(
    IEnumPStoreItems** ppenum    //out
);

Parameters ppenum
    Indirect pointer to the enumeration interface on the enumeration object. If the method is unsuccessful, this parameter's value is undefined.

Return Values

Returns an HRESULT. The following HRESULTS are returned for this method.

| Value | Meaning |
|---|---|
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | The method completed successfully. |

Remarks

Use this method to record a particular point in the enumeration sequence, and then return to that point at a later time. The new enumerator supports the same interface as the original one.

IEnumStoreItems::Next

Retrieves the next specified number of items in the enumeration sequence.
HRESULT Next(
    DWORD celt,    // in
    LPWSTR* rgelt,    // out
    DWORD* pceltFetched    // in/out
);

-continued

Parameters celt
    Number of elements being requested.
rgelt
    Array of size celt (or larger) of the elements of interest. The type of this parameter depends on the item being enumerated.
    See "Remarks" for details on de-allocating each of the returned elements.
pceltFetched
    Pointer to the number of elements actually supplied in rgelt. Caller can pass in NULL if celt is one.

Return Values

Returns an HRESULT. The following HRESULTS are returned for this method.

| Value | Meaning |
| --- | --- |
| ERROR_INVALID_PARAMETER | Value of celt is invalid. |
| ERROR_NO_MORE_ITEMS | Returned fewer elements than requested by celt. In this case, unused slots in the enumeration are not set to NULL and *pceltFetched holds the number of valid entries, even if zero is returned. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | Returned requested number of elements—*pceltFetched set if non_NULL. All requested entries are valid. |

Remarks

If there are fewer than the requested number of elements left in the sequence, it retrieves the remaining elements. The number of elements actually retrieved is returned through pceltFetched (unless the caller passed in NULL for that parameter).
Each of the returned elements in rgelt that contain valid data must be freed through a call to CoTaskMemFree, or a memory leak will occur. For more information, search the Microsoft Platform SDK for the function CoTaskMemFree.

IEnumPStoreItems::Reset

Resets the enumeration sequence to the beginning.
HRESULT Reset(
    void);

Parameters

None.

Return Values

Returns an HRESULT. The following HRESULTS, are returned for this method.

| Value | Meaning |
| --- | --- |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | The enumeration sequence was reset to the beginning. |

Remarks

Using a call to this method to reset the sequence does not guarantee that the same set of objects will be enumerated after the reset, because it depends on the collection being enumerated.

EnumPStoreItems::Skip

Skips over the next specified number of elements in the enumeration sequence.
HRESULT Skip(
    DWORD celt               // in
);

Parameters celt
    Number of elements to be skipped.

Return Values

Returns an HRESULT. The following HRESULTS are returned for this method.

-continued

| Value | Meaning |
| --- | --- |
| ERROR_NO_MORE_ITEMS | Returned fewer elements than requested by celt. In this case, unused slots in the enumeration are not set to NULL and *pceltFetched holds the number of valid entries, even if zero is returned. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | The number of elements skipped is equal to celt. |

IEnumPStoreProviders Interface

This object provides an enumeration interface for the PST_PROVIDERINFO objects in the Protected Storage area.
Note that any exceptions thrown internal to these methods are caught and passed back as error codes. The method definitions can be found in pstore.h.

| Methods | Description |
| --- | --- |
| Clone | Creates another enumerator that contains the same enumeration state as the current one. |
| Next | Retrieves the next specified number of items in the enumeration sequence. |
| Reset | Resets the enumeration sequence to the beginning. |
| Skip | Skips over a specified number of elements in the enumeration sequence. |

IEnumPStoreProviders::Clone

Creates another enumerator that contains the same enumeration state as the current one.
HRESULT Clone(
    IEnumPStoreProviders** ppenum    // out
);
Parameters ppenum
    Indirect pointer to the enumeration interface on the enumeration object. If the method is unsuccessful, this parameter's value is undefined.
Return Values Returns an HRESULT. The following HRESULTS are returned for this method.

| Value | Meaning |
| --- | --- |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | The method completed successfully. |

Remarks

Use this method to record a particular point in the enumeration sequence, and then return to that point at a later time. The new enumerator supports the same interface as the original one.

IEnumPStoreProviders::Next

Retrieves the next celt items in the enumeration sequence.

HRESULT Next(
    DWORD celt,    // in
    PST_PROVIDERINFO** rgelt,    // out
    DWORD *pceltFetched    // in/out
);
Parameters celt
    Number of elements being requested.
rgelt
    Array of size celt (or larger) of the elements of interest. The type of this parameter depends on the item being enumerated.
    See "Remarks" for details on de-allocating each of the returned elements.
pceltFetched
    Pointer to the number of elements actually supplied in rgelt. Caller can pass in NULL if celt is one.

-continued

Return Values

Returns an HRESULT. The following HRESULTS are returned for this method.

| Value | Meaning |
| --- | --- |
| ERROR_INVALID_PARAMETER | Value of celt is invalid. |
| ERROR_NO_MORE_ITEMS | Returned fewer elements than requested by celt. In this case, unused slots in the enumeration are not set to NULL, and *pceltFetched holds the number of valid entries, even if zero is returned. |
| PST_E_DISK_IMAGE_MISMATCH | Returned when a provider fails an integrity check. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | Returned requested number of elements - *pceltFetched set if non-NULL. All requested entries are valid. |

Remarks

If there are fewer than the requested number of elements left in the sequence, it retrieves the remaining elements. The number of elements actually retrieved is returned through pceltFetched (unless the caller passed in NULL for that parameter).
Each of the returned elements in rgelt that contain valid data must be freed through a call to CoTaskMemFree, or a memory leak will occur. For more information, search the Microsoft Platform SDK for the function CoTaskMemFree.

EnumPStoreProviders::Reset

Resets the enumeration sequence to the beginning.
HRESULT Reset(
    void);
);
Parameters None.
Return Values Returns an HRESULT. The following HRESULTS are returned for this method.

| Value | Meaning |
| --- | --- |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | The enumeration sequence was reset to the beginning. |

Remarks

Using a call to this method to reset the sequence does not guarantee that the same set of objects will be enumerated after the reset, because it depends on the collection being enumerated.

IEnumPStoreProviders::Skip

Skips over the next specified number of elements in the enumeration sequence.
HRESULT Skip(
    DWORDcelt                     // in
);
Parameters celt
    Number of elements to be skipped.
Return Values Returns an HRESULT. The following HRESULTS are returned for this method.

| Value | Meaning |
| --- | --- |
| ERROR_NO_MORE_ITEMS | Returned fewer elements than requested by celt. In this case, unused slots in the enumeration are not set to NULL and *pceltFatched holds the number of valid entries, even if zero is returned. |

-continued

| | |
|---|---|
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | The number of elements skipped is equal to celt. |

IEnumPStoreTypes Interface

This object provides an enumeration interface for Types in the Protected Storage area. Types are identified by their GUID.
Note that any exceptions thrown internal to these methods are caught and passed back as error codes.
The method definitions can be found in pstore.h.

| Methods | Description |
|---|---|
| Clone | Creates another enumerator that contains the same enumeration state as the current one. |
| Next | Retrieves the next specified number of items in the enumeration sequence. |
| Reset | Resets the enumeration sequence to the beginning. |
| Skip | Skips over a specified number of elements in the enumeration sequence. |

IEnumPStoreTypes::Clone

Creates another enumerator that contains the same enumeration state as the current one.
HRESULT Clone(
    IEnumPStoreTypes** ppenum     // out
Parameters ppenum
    Indirect pointer to the enumeration interface on the enumeration object. If the method is
    unsuccessful, this parameter's value is undefined.
Return Values Returns an HRESULT. The following HRESULTS are returned for this method.

| Value | Meaning |
|---|---|
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | The method completed successfully. |

Remarks

Using this method, a client can record a particular point in the enumeration sequence, and then return to that point at a later time. The new enumerator supports the same interface as the original one.

IEnumPStoreTypes::Next

Retrieves the next celt items in the enumeration sequence.
HRESULT Next(
    DWORD celt,     // in
    GUID* rgelt,     // out
    DWORD* pceltFetched     // in/out
Parameters celt
    Number of elements being requested.
rgelt
    Array of size celt (or larger) of the elements of interest. The type of this parameter depends on the
    item being enumerated.
pceltFetched
    Pointer to the number of elements actually supplied in rgelt. Caller can pass in NULL if celt
    is one.
    See "Remarks" for details on de-allocating each of the returned elements.
Return Values Returns an HRESULT. The following HRESULTS are returned for this method.

| Value | Meaning |
|---|---|
| ERROR_INVALID_PARAMETER | Value of celt is invalid. |
| ERROR_NO_MORE_ITEMS | Returned fewer elements than requested by celt. In this case, unused slots in the enumeration are not set to NULL and *pceltFetched holds the number of valid entries, even if zero is returned. |
| PST_E_INVALID_HANDLE | An invalid handle was supplied to the protected storage server. Typically, indicates corruption or |

-continued

|  |  |
|---|---|
|  | invalid handle state managed internally in the COM interface. |
| PST_E_FAIL | A general failure occurred within protected storage. Typically, indicates a memory allocation failure. |
| S_OK | Returned requested number of elements - *pceffFetched set if non-NULL. All requested entries are valid. |

Remarks

If there are fewer than the requested number of elements left in the sequence, it retrieves the remaining elements. The number of elements actually retrieved is returned through pceltFetched (unless the caller passed in NULL for that parameter).
Each of the returned elements in rgelt that contain valid data must be freed through a call to CoTaskMemFree or a memory leak will occur. For more information, search the Microsoft Platform SDK for the function CoTaskMemFree.

IEnumPStoreTypes::Reset

Resets the enumeration sequence to the beginning.
HRESULT Reset(
    void);
Parameters None.
Return Values Returns an HRESULT. The following HRESULTS are returned for this method.

| Value | Meaning |
|---|---|
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | The enumeration sequence was reset to the beginning. |

Remarks

Using a call to this method to reset the sequence does not guarantee that the same set of objects will be enumerated after the reset, because it depends on the collection being enumerated.

IEnumPStoreTypes::Skip

Skips over the next specified number of elements in the enumeration sequence.
HRESULT Skip(
    DWORD celt           // in
);
Parameters celt
    Number of elements to be skipped.
Return Values Returns an HRESULT. The following HRESULTS are returned for this method.

| Value | Meaning |
|---|---|
| ERROR_NO_MORE_ITEMS | Returned fewer elements than requested by celt. In this case, unused slots in the enumeration are not set to NULL and *pceItFetched holds the number of valid entries, even if zero is returned. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| S_OK | The number of elements skipped is equal to celt. |

IPStore Interface

The IPStore Onterface provides methods for managing protected data in the specified PStore provider.
The method definitions can be found in pstore.h.

| Methods | Description |
|---|---|
| CloseItem | Closes the specified Item. Subsequent access to the Item will require the provider's default user confirmation style. |
| CreateSubtype | Creates a new Subtype with a specified name in the designated provider, and stores its PST_ACCESRULESET. |

-continued

| | |
|---|---|
| CreateType | Creates the specified Type for the specified user/machine. |
| DeleteItem | Deletes the specified Item. A prompt may be generated. |
| DeleteSubtype | Deletes the specified Subtype. |
| DeleteType | Deletes the specified Type. |
| EnumItems | This method returns an enumeration object which can be used to enumerate information about the specified Items. |
| EnumSubtypes | This method returns an enumeration object which can be used to enumerate information about the specified Subtypes. |
| EnumTypes | This method returns an enumeration object which can be used to enumerate information about the specified Types. |
| GetInfo | Retrieves information about the Protected Store Interface object obtained from a call to PStoreCreateInstance. |
| GetProvParam | The GetProvParam method retrieves the parameters that govern the operations of a PStore Provider. |
| GetSubtypeInfo | Retrieves the PST_TYPEINFO structure that corresponds to theSubtype specified. |
| GetTypeInfo | Retrieves the PST_TYPEINFO structure for the Type specified. |
| OpenItem | This method opend the specified Item for the indicated access modes. |
| ReadAccessRuleset | This method reads and returnd the PST_ACCESSRULESET structure for the given Subtype. |
| ReadItem | This method reads the specified Item and returns it in a data buffer. |
| SetProvParam | The SetProvParam method sets the parameters that govern the operation of a PStoreProvider. |
| WriteAccessRuleset | This method set the PST_ACCESSRULESET for the given Type and Subtype. |
| WriteItem | This method stores the specified data under the specified Type and Subtype, and with the specified name. |

IPStore::CloseItem

Closes the specified Item. Subsequent access to the Item will require the provider's default user confirmation style.
HRESULT CloseItem(
    PST_KEY Key,          // in
    const GUID* pItemType,    // in
    const GUID* pItemSubtype,  // in
    LPCWSTR szItemName,      // in
    DWORD dwFlags          // in
);
Parameters Key
    Specifies the storage area for the Item, and is based on the computer being used or is based on an individual user (where there may be more than one user for this computer).
    Currently defined values for Key are shown in the following table.
        Key
        PST_KEY_CURRENT_USER
        PST_KEY_LOCAL_MACHINE
pItemType
    Specifies a pointer to the Type of the Item being closed.
pItemSubtype
    Specifies a pointer to the Subtype for the Item being closed.
szItemName
    A string specifying the friendly name of the Item being closed.
dwFlags
    The flag values. This parameter is reserved for future use and should be set to zero in the interim to ensure future compatibility.
Return Values Returns an HRESULT. The following HRESULTS are returned for this method.

| Value | Meaning |
|---|---|
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::Open Item

IPStore::CreateSubtype

Creates a new Subtype with the specified name in the provider, and stores its
PST_ACCESSRULESET.
HRESULT CreateSubtype(
    PST_KEY Key,               // in -continued

```
    const GUID* pType,              // in
    const GUID* pSubtype,           // in
    PST_TYPEINFO* pInfo,            // in
    PST_ACCESSRULESET* pRules,      // in
    DWORD dwFlags                   // in
);
```
Parameters Key
    Specifies the storage area for the Subtype being created, and is based on the computer being used or is based on an individual user (where there may be more than one user for this computer).
    Currently defined values for Key are shown in the following table.
        Key
        PST_KEY_CURRENT_USER
        PST_KEY_LOCAL_MACHINE
    pType
        Specifies a pointer to the Type for which the Subtype is being created.
        pstore.h lists the GUIDs for the currently defined Types.
    pSubtype
        Specifies a pointer to the Subtype that is being created.
        pstore.h lists the GUIDs for the currently defined Subtypes.
    pInfo
        A pointer to the PST_TYPEINFO structure.
    pRules
        A pointer to the PST_ACCESSRULESET structure for this new Subtype. If a NULL pointer for pRules is passed in, it is interpreted as an empty Access Rule Set and there are no application access restrictions. All applications are allowed access.
    dwFlags
        The flag values. This parameter is reserved for future use and should be set to zero in the interim to ensure future compatibility.

Return Values

Returns an HRESULT. The following HRESULTS are returned for this method.

| Value | Meaning |
| --- | --- |
| PST_E_OK | The method completed successfully. |
| PST_E_TYPE_EXISTS | Indicates the Subtype already exists. |
| PST_E_NO_PERMISSIONS | Indicates that the user does not have the permission for this type of operation. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |
| PST_E_INVALID_RULESET | The ruleset specified was invalid. |

See Also
IPStore::DeleteSubtype

IPStore::CreateType

Creates the specified Type for the specified user/machine.
```
HRESULT CreateType(
    PST_KEY Key,                    // in
    const GUID* pType,              // in
    PST_TYPEINFO* pInfo,            // in
    DWORD dwFlags                   // in
);
```
Parameters Key
    Specifies the storage area for the Type being created, and is based on the computer being used or is based on an individual user (where there may be more than one user for this computer).
    Currently defined values for Key are shown in the following table.
        Key
        PST_KEY_CURRENT_USER
        PST_KEY_LOCAL_MACHINE
pType
    Specifies a pointer to the Type which is being created.
    pstore.h lists the GUIDs for the currently defined Types.
pInfo
    Specifies a pointer to the PST_TYPEINFO data structure that contains the information about the Type being created.
dwFlags
    The flag values. This parameter is reserved for future use and should be set to zero in the interim to ensure future compatibility.

Return Values

Returns an HRESULT. The following HRESULTS are returned for this method.

-continued

| Value | Meaning |
| --- | --- |
| PST_E_OK | The method completed successfully. |
| PST_E_TYPE_EXISTS | Indicates the Type already exists. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::DeleteType

IPStore::DeleteItem

Deletes the specified Item. A prompt may be generated.
```
HRESULT DeleteItem(
    PST_KEY Key,                  // in
    const GUID* pItemType,        // in
    const GUID* pItemSubtype,     // in
    LPCWSTR szItemName,           // in
    PST PROMPTINFO* pPromptInfo  , // in
    DWORD dwFlags                 // in
);
```
Parameters Key
    Specifies the storage area for the Item being deleted, and is based on the computer being used or
    is based on an individual user (where there may be more than one user for this computer).
    Currently defined values for Key are shown in the following table.
        Key
        PST_KEY_CURRENT_USER
        PST_KEY_LOCAL_MACHINE
pItemType
    Specifies a pointer to the Type of the Item that is being deleted.
pItemSubtype
    Specifies a pointer to the Subtype of the Item that is being deleted.
szItemName
    A string specifying the friendly name of the Item that is being deleted.
pPromptInfo
    Specifies a pointer to the PST_PROMPTINFO data structure that contains the prompting
    information for a dialog box that is displayed to the user to confirm the deletion of the item.
dwFlags
    The flag values. This parameter is reserved for future use and should be set to zero in the interim to
    ensure future compatibility.
Return Values Returns an HRESULT. The following HRESULTS are returned for this method.

| Value | Meaning |
| --- | --- |
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::WriteItem

IPStore::DeleteSubtype

Deletes the specified Subtype.
```
HRESULT DeleteSubtype(
    PST_KEY Key,              // in
    const GUID* pType,        // in
    const GUID* pSubtype,     // in
    DWORD dwFlags             // in
);
```
Parameters Key
    Specifies the storage area for the Subtype being deleted, and is based on the computer being used
    or is based on an individual user (where there may be more than one user for this computer).
    Currently defined values for Key are shown in the following table.
        Key
        PST_KEY_CURRENT_USER
        PST_KEY_LOCAL_MACHINE
pType
    Specifies a pointer to the Type associated with the Subtype that is being deleted.
    pstore.h lists the GUIDs for the currently defined Types.

-continued pSubtype
    Specifies a pointer to the Subtype that is being deleted. Specifies a pointer to the Subtype that is being created.
    pstore.h lists the GUIDs for the currently defined Subtypes.
dwFlags
    The flag values. This parameter is reserved for future use and should be set to zero in the interim to ensure future compatibility.
Return Values Returns an HRESULT. The following HRESULTS are returned for this method.

| Value | Meaning |
| --- | --- |
| PST_E_OK | The method completed successfully. |
| PST_E_NOTEMPTY | Indicates that the Subtype still has an Item. The Subtype must be completely empty before it can be deleted. |
| PST_E_NOTEXISTS | Indicates that the Subtype does not exist. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::CreateSubtype

IPStore:DeleteType

Deletes the specified Type.
```
HRESULT DeleteType(
    PST_KEY Key,            // in
    const GUID* pType,      // in
    DWORD dwFlags           // in
);
```
Parameters Key
    Specifies the storage area for the Type being deleted, and is based on the computer being used or is based on an individual user (where there may be more than one user for this computer).
    Currently defined values for Key are shown in the following table.
        Key
        PST_KEY_CURRENT_USER
        PST_KEY_LOCAL_MACHINE
pType
    Specifies a pointer to the Type that is being deleted.
    pstore.h lists the GUIDs for the currently defined Types.
dwFlags
    The flag values. This parameter is reserved for future use and should be set to zero in the interim to ensure future compatibility.
Return Values Returns an HRESULT. The following HRESULTS are returned for this method.

| Value | Meaning |
| --- | --- |
| PST_E_OK | The method completed successfully. |
| PST_E_NOTEMPTY | Indicates that the Type still has an Item or Subtype. The Type must be completely empty before it can be deleted. |
| PST_E_NOTEXISTS | Indicates that the Type does not exist. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::CreateType

IPStore::EnumItems

This method returns an enumeration object that.can be used to enumerate information about the specified Items.
```
HRESULT EnumItems(
PST KEY Key,                      // in
const GUID* pItemType,            // in
const GUID* pItemSubtype,         // in
DWORD dwFlags,                    // in
IEnumPStoreItems** ppenum         // in/out
);
```

-continued

Parameters

Key
    Specifies the storage area for the Item being enumerated, and is based on the computer being used
    or is based on an individual user (where there may be more than one user for this computer).
    Currently defined values for Key are shown in the following table.
        Key
        PST_KEY_CURRENT_USER
        PST_KEY_LOCAL_MACHINE
pItemType
    Specifies a pointer to the Type of the Item that is being enumerated.
    pstore.h lists the GUIDs for the currently defined Types.
pItemSubtype
    Specifies a pointer to the Subtype of the Item that is being enumerated.
    pstore.h lists the GUIDs for the currently defined Subtypes.
dwFlags
    The flag values. This parameter is reserved for future use and should be set to zero in the interim to
    ensure future compatibility.
ppenum
    An indirect pointer to the returned enumeration object. See "Remarks" for details on de-allocating
    the enumeration object.
Return Values Returns an HRESULT. The following HRESULTS are returned for this method.

| Value | Meaning |
| --- | --- |
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred wit hin protected storage. Typically, indicates a memory allocation failure. |

Remarks

The enumeration object returned in ppenum must be freed through a call to CoTaskMemFree or a
memory leak will occur. For more information, search the Microsoft Platform SDK for the function
CoTaskMemFree.
See Also
IPStore::EnumSubtypes, IPStore::EnumTypes IPStore::EnumSubtypes This method returns an enumeration object that can be used to enumerate information about
the specified Subtypes.
Note that there are no access restrictions on enumerating Subtypes. Note that the same enumerator
as in EnumTypes is used.
HRESULT EnumSubtypes(
    PST KEY Key,                // in
    const GUID* pType,          // in
    DWORD dwFlags,            // in
    IEnumPStoreTypes** ppenum  // in
);
Parameters Key
    Specifies the storage area for the Subtype being enumerated, and is based on the computer being
    used or is based on an individual user (where there may be more than one user for this computer).
    Currently defined values for Key are shown in the following table.
        Key
        PST_KEY_CURRENT_USER
        PST_KEY_LOCAL_MACHINE
pType
    Specifies a pointer to the Type that is being enumerated.
    pstore.h lists the GUIDs for the currently defined Types.
dwFlags
    The flag values. This parameter is reserved for future use and should be set to zero in the interim to
    ensure future compatibility.
ppenum
    An indirect pointer to the returned enumeration object. See "Remarks" for details on de-allocating
    the enumeration object.
Return Values Returns an HRESULT. The following HRESULTS are returned for this method.

| Value | Meaning |
| --- | --- |
| PST_E_OK | The method completed successfully. |
| PST_E_INVALID_HANDLE | An invalid handle was supplied to the protected storage server. Typically, indicates corruption or invalid handle state managed internally in the COM interface. |

-continued

| PST_E_FAIL | A general failure occurred within protected storage. Typically, indicates a memory allocation failure. |

Remarks

The enumeration object returned in ppenum must be freed through a call to CoTaskMemFree or a memory leak will occur. For more information, search the Microsoft Platform SDK for the function CoTaskMemFree.
See Also
IPStore::EnumItems, IPStore::EnumTypes IPStore:EnumTypes This method returns an enumeration object that can be used to enumerate information about the specified Types.
Note that there are no access restrictions on enumerating Types.
HRESULT EnumTypes(
    PST_KEY Key,                   // in
    DWORD dwFlags,            // in
    IEnumPStoreTypes** ppenum    // in
);
Parameters Key
    Specifies the storage area for the Type being enumerated, and is based on the computer being
    used or is based on an individual user (where there may be more than one user for this computer).
    Currently defined values for Key are shown in the following table.
        Key
        PST_KEY_CURRENT_USER
        PST_KEY_LOCALMACHINE
dwFlags
    The flag values. This parameter is reserved for future use and should be set to zero in the interim to
    ensure future compatibility.
ppenum
    An indirect pointer to the returned enumeration object. See "Remarks" for details on de-allocating
    the enumeration object.
Return Values Returns an HRESULT. The following HRESULTS are returned for this method.

| Value | Meaning |
|---|---|
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks

The enumeration object returned in ppenum must be freed through a call to CoTaskMemFree or a memory leak will occur. For more information, search the Microsoft Platform SDK for the function CoTaskMemFree.
See Also
IPStore::EnumItems, IPStore::EnumSubtypes IPStore::GetInfo Retrieves information about the Protected Store interface object obtained from a call to
PStoreCreateInstance. Information about the provider's identifier, capabilities supported, and its
friendly name are returned. (A PST_PROVIDERINFO is also returned by PStoreEnumProviders.)
HRESULT GetInfo(
    PPST_PROVIDERINFO* ppProperties  // out
);
Parameters ppProperties
    A pointer to the PST_PROVIDERINFO structure returned. See "Remarks" for details on it's
    de-allocation.
Return Values Returns an HRESULT. The following HRESULTS are returned for this method.

| Value | Meaning |
|---|---|
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

-continued

Remarks

The PST_PROVIDERINFO returned in ppProviderProperties must be freed through a call to CoTaskMemFree or a memory leak will occur. For more information, search the Microsoft Platform SDK for the function CoTaskMemFree.
See Also
IPStore::GetSubtypeInfo, IPStore::GetTypeInfo IPStore::GetProvParam The GetProvParam method retrieves the parameters that govern the operations of a PStore Provider. This method is Provider dependent.
HRESULT GetProvParam(
    DWORD dwParam,          // in
    DWORD* pcbData,         // in /out
    BYTE** ppbData,         // out
    DWORD dwFlags          // in
);
Parameters dwParam
    The parameter number. Currently, no parameters are defined for which this get operation is applicable. However, there is a parameter defined for the set operation. See SetProvParam for details.
pcbData
    A pointer to the length of the parameter data buffer. Upon return, this address will contain the number of bytes of parameter data copied to the buffer.
ppbData
    An indirect pointer to the parameter data buffer allocated by this method. The method copies the specified parameter data to the allocated buffer. The form of this data will vary, depending on the parameter number. See "Remarks" for details on its de-allocation.
dwFlags
    This parameter is reserved for future use and should be set to zero in the interim to ensure future compatibility.
Return Values Returns an HRESULT. The following HRESULTS are returned for this method.

| Value | Meaning |
| --- | --- |
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks

The memory buffer returned in ppbData must be freed through a call to CoTaskMemFree or a memory leak will occur. For more information, search the Microsoft Platform SDK for the function CoTaskMemFree.
See Also
IPStore::SetProvParam IPStore::GetSubtypeInfo Retrieves the PST_TYPEINFO structure that corresponds to the Subtype specified.
Note that there are no access restrictions on obtaining Subtype info.
HRESULT GetSubtypeinfo(
    PST_KEY Key,           // in
    const GUID* pType,      // in
    const GUID* pSubtype,   // in
    PPST_TYPEINFO* ppInfo,  // out
    DWORD dwFlags         // in
);
Parameters Key
    Specifies the storage area for the Subtype for which the PST_TYPEINFO information is being retrieved, and is based on the computer being used or is based on an individual user (where there may be more than one user for this computer).
    Currently defined values for Key are shown in the following table.
        Key
        PST_KEY_CURRENT_USER
        PST_KEY_ILOCAL_MACHINE
pType
    Specifies a pointer to the Type for the specified Subtype for which data is being retrieved.
pSubtype
    A pointer to the specified Subtype for which data is being retrieved.
ppInfo -continued A pointer to the PST_TYPEINFO structure retrieved. See "Remarks" for details on it's de-allocation.
dwFlags
    The flag values. This parameter is reserved for future use and should be set to zero in the interim to
    ensure future compatibility.
Return Values Returns an HRESULT. The following HRESULTS are returned for this method.

| Value | Meaning |
|---|---|
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks

The PST_TYPEINFO returned in ppInfo must be freed through a call to CoTaskMernFree or a
memory leak will occur. For more information, search the Microsoft Platform SDK for the function
CoTaskMemFree.
See Also
IPStore::GetInfo, IPStore::GetTypeInfo IPStore::GetTypeInfo Retrieves the PST_TYPEINFO structure for the Type specified.
Note that there are no access restrictions on obtaining Subtype information.
HRESULT GetTypeInfo(
    PST_KEY Key,                      // in
    const GUID* pType,           // in
    PPST_TYPEIINFO* ppInfo,   // out
    DWORD dwFlags             // in
);
Parameters Key
    Specifies ihe storage area for the Type for which the PST_TYPEINFO information is being
    retrieved, and is based on the computer being used or is based on an individual user (where there
    may be more than one user for this computer).
    Currently defined values for Key are shown in the following table.
        Key
        PST_KEY_CURRENT_USER
        PST_KEY_LOCAL_MACHINE
pType
    A pointer to the specified Type for which data is being retrieved.
ppInfo
    A pointer to the PST_TYPEINFO structure retrieved. See "Remarks" for details on it's de-allocation.
dwFlags
    The flag values. This parameter is reserved for future use and should be set to zero in the interim to
    ensure future compatibility.
Return Values Returns an HRESULT. The following HRESULTS are returned for this method.

| Value | Meaning |
|---|---|
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks

The PST_TYPEINFO returned in ppInfo must be freed through a call to CoTaskMemFree or a
memory leak will occur. For more information, search the Microsoft Platform SDK for the function
CoTaskMemFree.
See Also
IPStore::GetInfo, IPStore::GetSubtypeInfo IPStore::OpenItem This method opens the specified Item for the indicated access modes. The Item will remain open
until CloseItem is called or the interface pointer is destroyed. If an Item is open, calls to ReadItem,
WriteItem, DeleteItem, EnumItem will not require any user confirmation.
HRESULT OpenItem(
    PST_KEY Key,                  // in
    const GUID* pItemType,      // in
    const GUID* pItemSubtype,   // in
    LPCWSTR szItemName,       // in

```
        PST_ACCESSMODE ModeFlags,      // in
        PST_PROMPTINFO* pPromptInfo,   // in
        DWORD dwFlags                  // in
);
```
Parameters Key
    Specifies the storage area for the Item, and is based on the computer being used or is based on an individual user (where there may be more than one user for this computer).
    Currently defined values for Key are shown in the following table.
        Key
        PST_KEY_CURRENT_USER
        PST_KEY_LOCAL_MACHINE
pItemType
    Specifies a pointer to the Type of the Item being opened.
pItemSubtype
    Specifies a pointer to the Subtype for the Item being opened.
szItemName
    A string specifying the friendly name of the Item being opened. ModeFlags
    Specifies the modes for which the Item is being opened.
pPromptInfo
    Specifies a pointer to the PST_PROMPTINFO data structure that contains the prompting information for a dialog box that is displayed to the user to confirm the opening of the Item.
dwFlags
    The flag values. This parameter is reserved for future use and should be set to zero in the interim to ensure future compatibility.

Return Values

Returns an HRESULT. The following HRESULTS are returned for this method.

| Value | Meaning |
| --- | --- |
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::CloseItem

IPStore::ReadAccessRuleset

This method reads and returns the PST_ACCESSRULESET structure for the given Subtype.
Note that in order to read the Access Rules, the caller must satisfy the existing Access Rules.

```
HRESULT ReadAccessRuleset(
        PST_KEY Key,                       // in
        const GUID* pType,                 // in
        const GUID* pSubtype,              // in
        PPST_ACCESSRULESET* ppRules,       // out
        DWORD dwFlags                      // in
);
```
Parameters Key
    Specifies the storage area for the Access Rules, and is based on the computer being used or is based on an individual user (where there may be more than one user for this computer).
    Currently defined values for Key are shown in the following table.
        Key
        PST_KEY_CURRENT_USER
        PST_KEY_LOCAL_MACHINE
pType
    Specifies a pointer to the specified Type for which the Access Rules are being read.
pSubtype
    Specifies a pointer to the specified Subtype for which the Access Rules are being read.
ppRules
    A pointer to the PST_ACCESSRULESET structure returned. See "Remarks" for details on its de-allocation.
dwFlags
    The flag values. This parameter is reserved for future use and should be set to zero in the interim to ensure future compatibility.

Return Values

Returns an HRESULT. The following HRESULTS are returned for this method.

| Value | Meaning |
| --- | --- |
| PST_E_OK | The method completed successfully. |
| PST_E_NOTEXISTS | Indicates that the Type does not exist. |
| PST_E_NO_PERMISSIONS | Indicates that the user does not have the permission for this type of operation. |

-continued

| | |
|---|---|
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks

The PST_ACCESSRULESET returned in ppRules must be freed through a call to CoTaskMemFree
or a memory leak will occur. For more information, search the Microsoft Platform SDK
for the function CoTaskMemFree.
See Also
IPStore::WriteAccessRuleset IPStore::ReadItem This method reads the specified Item and returns it in a data buffer.
Calling ReadItem may initiate user confirmation, depending on how the user has defined the Item.
HIRESULT ReadItem(
    PST KEY Key,                          H in
    con;t GUID* pItemType,            // in
    const GUID* pItemSubtype,        // in
    LPCWSTR szItemName,             // in
    DWORD* pcbData,                 // in/out
    BYTE** ppbData,                 // out
    PST_PROMPTINFO* pPromptInfo,   // in
    DWORD dwFlags                 // in
);
Parameters Key
    Specifies the storage area for the Item, and is based on the computer being used or is based on an
    individual user (where there may be more than one user for this computer).
    Currently defined values for Key are shown in the following table.
        Key
        PST_KEY_CURRENT_USER
        PST_KEY_LOCAL_MACHINE
pItemType
    Specifies a pointer to the Type of the Item being read.
pItemSubtype
    Specifies a pointer to the Subtype for the Item being read.
szItemName
    A string specifying the friendly name of the Item being read.
pcbData
    A pointer to the length of the data buffer. Upon return, this address will contain the number of bytes
    of data copied to the buffer.
ppbData
    An indirect pointer to the data buffer allocated by this method in which the Item is returned. This
    method will copy the specified Item to this buffer. See "Remarks" for details on de-allocating the
    buffer.
pPromptInfo
    Specifies a pointer to the PST_PROMPTINFO data structure that contains the prompting
    information for a dialog box that is displayed to the user to confirm the reading of the Item.
    The prompt string and any other application supplied information appears in the application prompt
    area in the user confirmation dialog box when user confirmation is required. The rest of the
    confirmation dialog is not controlled by the application.
dwFlags
    The flag values.
    Currently defined values for dwFlags are shown in the following table.
        dwFlags
        PST_UNRESTRICTED_ITEMDATA
    PST_UNRESTRICTED_ITEMDATA specified requests that the Provider read unprotected data
    associated with the Item, to which access is unrestricted. If the Item does not exist, an error will be
    returned.
Return Values Returns an HRESULT. The following HRESULTS are returned for this method.

| Value | Meaning |
|---|---|
| PST_E_OK | The method completed successfully. |
| PST_E_NO_PERMISSIONS | Indicates that the user does not have the permission for this type of operation. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

-continued

Remarks

The memory buffer returned in ppbData must be freed through a call to CoTaskMemFree or a memory leak will occur. For more information, search the Microsoft Platform SDK for the function CoTaskMemFree.
See Also
IPStore::WriteItem IPStore::SetProvParam The SetProvParam method sets the parameters that govern the operations of a PStore Provider. This method is Provider dependent.
HRESULT SetProvParam(
    DWORD dwParam,                  // in
    DWORD cbData,                    // in
    BYTE* pbData,                   // in
    DWORD dwFlags                 // in
);
Parameters dwParam
    The parameter number. See "Remarks" section for a list of valid parameters.
cbData
    The length of the parameter data buffer. Before calling this method, the caller
    should set this parameter to the length, in bytes, of the ppbData buffer.
pbData
    A pointer to the parameter data buffer. Place the parameter data in this buffer before calling
    SetProvParam. The form of this data will vary, depending on the parameter number.
dwFlags
    The flag values. This parameter is reserved for future use and should be set to zero in the interim to
    ensure future compatibility.
Return Values Returns an HRESULT. The following HRESULTS are returned for this method.

| Value | Meaning |
| --- | --- |
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks dwParam can be set to PST_PP_FLUSH_PW_CACHE to flush the password cache. As a result, any passwords the user has selected to be remembered (by checking the appropriate box in a confirmation dialog) are flushed from memory, and will need to be re_entered the next time they are used in an operation.
See Also
IPStore::GetProvParam IPStore::WriteAccessRuleset This method sets the PST_ACCESSRULESET for the given Type and Subtype.
Note that in order to set new Access Rules, the caller must satisfy the existing Access Rules.
HRESULT WriteAccessRuleset(
    PST KEY Key,                  // in
    const GUID* pType,           // in
    const GUID* pSubtype,       // in
    PST_ACCESSRULESET_pRules,   // in
    DWORD dwFlags                 // in
);
Parameters Key
    Specifies the storage area for the Access Rules, and is based on the computer being used or is
    based on an individual user (where there may be more than one user for this computer).
    Currently defined values for Key are shown in the following table.
        Key
        PST_KEY_CURRENT_USER
        PST_KEY_LOCAL_MACHINE
pType
    Specifies a pointer to the specified Type for which the Access Rules are being set.
pSubtype
    Specifies a pointer to the specified Subtype for which the Access Rules are being set.
pRules
    A pointer to the PST_ACCESSRULESET structure that contains the new value for the Access
Rules.
    If a NULL pointer for pRules is passed in, it is interpreted as an empty Access Rule Set and there -continued are no application access restrictions. All applications are allowed access.

dwFlags
    The flag values. This parameter is reserved for future use and should be set to zero in the interim to ensure future compatibility.

Return Values

Returns an HRESULT. The following HRESULTS are returned for this method.

| Value | Meaning |
| --- | --- |
| PST_E_OK | The method completed successfully. |
| PST_E_NO_PERMISSIONS | Indicates that the user does not have the permission for this type of operation. |
| PST_E_INVALID_RULESET | The ruleset specified was invalid. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::ReadAccessRuleset

IPStore::WriteItem

This method stores the specified data under the specified Type and Subtype, and with the specified name. If the Item already exists, and the PST_NO_OVERWRITE flag is specified, then the Item is not written and an error is generated.

```
HRESULT WriteItem(
    PST_KEY Key,                           // in
    const GUID* pItemType,                 // in
    const GUID* pItemSubtype,              // in
    LPCWSTR szItemName,                    // in
    DWORD cbData,                          // in
    BYTE* pbData,                          // in
    PST PROMPTINFO* pPromptInfo,           // in
    DWORD dwDefaultConfirmationStyle,      // in
    DWORD dwFlags                          // in
);
```

Parameters

Key
    Specifies the storage area for the Item, and is based on the computer being used or is based on an individual user (where there may be more than one user for this computer).
    Currently defined values for Key are shown in the following table.
        Key
        PST_KEY_CURRENT_USER
        PST_KEY_LOCAL_MACHINE pItemType
    Specifies a pointer to the Type of the Item being set.

pItemSubtype
    Specifies a pointer to the Subtype for the Item being set.

szItemName
    A string specifying the friendly name of the Item being set.

cbData
    The length of the data buffer. Before Galling this method, the caller should set this parameter to the length, in bytes, of the pbData buffer.

pbData
    A pointer to the data buffer that contains the specified Item to be set.

pPromptInfo
    Specifies a pointer to the PST_PROMPTINFO data structure that contains the prompting information for a dialog box that is displayed to the user to confirm the reading of the item.

dwDefaultConfirmationStyle
    Specifies the default confirmation behavior to be used for prompting the user.
    If the item does not yet exist, the application may specify a default confirmation behavior to be used for this item, via dwDetauffConfirmationStyle. Note that, although there are many circumstances under which the user will not be prompted when an Item is first written, this is not guaranteed. Therefore, an appropriate pPromptInfo parameter should always be passed in.
    Currently defined values for dwDefauftConfirmationStyleare shown in the following table.
        dwDefaultConfirmationStyle
        PST_CF_DEFAULT
        PST_CF_NONE
    PST_CF_DEFAULT specifies that the default confirmation behavior be used, which may be set by the user or administrator. For the system Provider, the default depends on whether the user is logged in (typical in corporate settings) or not (typical in home settings). For the PStore System Provider, if the user is logged in, the Windows password will be used as the default confirmation behavior; otherwise OK / Cancel will be used.
    PST_CF_NONE specifies that the application requests silent access, that is, no user confirmation is required for accessing items of this Type. Note that the Provider is not required to honor this request. If honored, the prompt will not be displayed (no Ul will be presented in creating this Subtype).

-continued dwFlags
    The flag values.
    Currently defined values for dwFlags are shown in the following table.
        dwFlags
        PST_NO_OVERWRITE
        PST_UNRESTRICTED_ITEMDATA
    PST_NO_OVERWRITE specifies that if the Item already exists, the Item will not be written and the
    error PST_E_EXISTS will be returned. One use of this flag is, as in the case of per_Item
    confirmation, to ensure that another application hasn't already created the Item with inappropriate
    confirmation. (it is also possible to find out whether the Item exists by enumerating Items in the
    Subtype). Opening the Item will not nullify the NO_OVERWRITE protection. Unrestricted Item data
    can still be added, despite the NO_OVERWRITE protection.
    PST_UNRESTRICTED_ITEMDATA requests that the Provider write unprotected data associated
    with The Item, to which access is unrestricted. If the Item does not yet exist (having been written without
    this flag) an error will be returned.
    For items with an unrestricted data stream the following applies:
        Deleting the item also deletes it's unrestricted data stream.
        Combining PST_UNRESTRICTED_ITEMDATA with PST_NO_OVERWRITE has no effect on
        the overwrite characteristics of the unrestricted item data stream.
Return Values Returns an HRESULT. The following HRESULTS are returned for this method.

| Value | Meaning |
| --- | --- |
| PST_E_OK | The method completed successfully. |
| PST_E_NOTEXISTS | Indicates the Item's Type and Subtype do not currently exist. |
| PST_E_NO_PERMISSIONS | Indicates that the user does not have permission for this type of operation. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::Read Item

Protected Storage Data Structures

The following data structures are used by the functions and methods contained in the Microsoft®
Protected Storage API. The structures are listed alphabetically. These structures can be found in pstore.h.
This structure contains a single instance of access clause data. It is used at the time of Subtype
creation, and establishes rules governing which applications and users should be granted access to
protected data.
More than one access clause can be used to establish a single access rule. This is accomplished by
adding additional PST_ACCESSCLAUSE structures to the rgClauses array contained in the
PST_ACCESSRULE data structure.
typedef struct_PST_ACCESSCLAUSE
    {
    DWORD cbSize;
    PST_ACCESSCLAUSETYPE ClauseType;
    DWORD cbClauseData;
    VOID* pbClauseData;
    }    PST_ACCESSCLAUSE;
Members cbSize
    The count of bytes in this data structure. It should be set to sizoof(PST_ACCESSCLAUSE).
ClauseType
    Specifies the type of the clause data contained in the pbClauseData member.
    Currently defined access clause types are shown in the following table, and described in the text that follows it.
        ClauseType
        PST_AUTHENTICODE
        PST_BINARY_CHECK
        PST_SECURITY_DESCRIPTOR
PST_AUTHENTICODE
    A ClauseType of PST_AUTHENTICODE specifies that pbClauseData points to a
    PST_AUTHENTICODEDATA data structure.
    If the PST_AUTHENTICODE clause type was specified at the time of Subtype creation, a check
    will be made to see if the requesting application was signed or not, and if signed, by whom. The
    clause may specify a particular root, certificate issuer, publisher (signer), or program name.
    Access will not be granted unless the specified criteria are met. Not all of the criteria need be
    specified for access. If none are specified, the verification amounts to allowing any Authenticode
    verified application or module access to the data. Authenticode checking uses Wintrust.dll to
    verify the binary of the module under inspection. For more information on Authenticode, search
    for "Authenticode" on http://www.microsoft.com.
    Note that applications may provide additional checking of their own. For instance, an applicatio
    such as the Java virtual machine may choose to verify that Java classes are being run.

-continued

PST_BINARY_CHECK
    A ClauseType of PST_BINARY_CHECK specifies that pbClauseData points to a
    PST_BINARYCHECKDATA data structure.
    When an application is installed, or loaded, PStore can be prompted to take a "snapshot" (hash)
    of the binary pattern for that application. Then, when the application is loaded at a later time, PStore
    again takes the hash of the application and compares the original hash with the one just taken. Only if the
    two hashes match will PStore allow the application access to the specified data. Thus, if the application
    has changed since it was installed, and therefore the possibility
    exists that it has been tampered with, the data will be protected.
PST_SECURITY_DESCRIPTOR
    A ClauseType of PST_SECURITY_DESCRIPTOR specifies that pbClauseData points to
    the Microsoft Windows NT® security descriptor.
    The PST_SECURITY_DESCRIPTOR clause is intended to allow access only to specified users
    or groups, and is enforced only on Windows NT platforms. If this clause is applied on a Microsoft
    Windowse 95® platform, it will be ignored. This clause gets the necessary information about the
    current user and groups from the ACLs contained in the Windows NT security descriptor. Setting
    the SACL in the security descriptor has no effect in this version of PStore. Audit is supported
    natively at a higher level in PStore (e.g., all actions such as creating Types and Subtypes, and
    Item read/write and deletion can all be audited).
cbClauseData
    Specifies the count of bytes in the data pointed to by pbClauseData.
pbClauseData
    A pointer to the data specified by the ClauseType.
See Also
PST_ACCESSRULE, PST_AUTHENTICODEDATA, PST_BINARYCHECKDATA

PST_ACCESSRULE

This structure contains an array of PST_ACCESSCLAUSE data structures. This grouping together of
Access Clause data structures forms an Access Rule. For an Access Rule to be considered granted,
all of the individual Access Clauses that it contains must grant access. In other words, an Access Rule
is considered granted based on a logical AND of all the Access Clauses that it contains.
More than one access rule can be applied to a given Subtype. To do this, PST_ACCESSRULE data
structures are combined in an array as part of the PST_ACCESSRULESET data structure. If more
than one rule is added to the array, access to the protected data will be granted if any one of the rules
grant access, but only for the mode of access granted in that rule. In other words, the rules are
evaluated on a logical OR basis, and the first one in the array is evaluated first.
typedef struct_PST_ACCESSRULE
    {
    DWORD cbSize;
    PST_ACCESSMODE AccessModeFlags;
    DWORD cClauses;
    PST_ACCESSCLAUSE *rgClauses;
    }    PST_ACCESSRULE;
Members cbSize
    The count of bytes in this data structure. It should be set to sizoof(PST_ACCESSRULE).
AccessModeFlags
    Each access rule has an access mode flag associated with it. This flag determines the type of
    access granted if all of the clauses are satisfied. There are two Access Modes currently defined,
    Read and Write access. Read allows only the retrieving of protected data, whereas Write only
    allows the storing of protected data. The Read and Write access modes may be combined with a
    bitwise OR operation (PST_READ I PST_WRITE) to allow both reading and writing accesses. Other
    modes may be added in the future.
    Currently defined values for AccessModeFlags are shown in the following table:
        AccessModeFlags
        PST_READ
        PST_WRITE
cClauses
    Specifies the count of Access Clause elements in the rgClauses array.
rgClauses
    Contains an array of PST_ACCESSCLAUSE elements.
See Also
PST_ACCESSCLAUSE, PST_ACCESSRULESET

PST_ACCESSRULESET

Access to protected data by applications is controlled through the use of Access Rules.
This structure contains an array of PST_ACCESSRULE data structures. This grouping together of
access rule data structures forms the Access Rules. The Access Rules are considered to be granted if
any of the individual PST_ACCESSRULE data structures that it contains grant access. In other words,
the Access Rules are considered granted based on a logical OR of all the PST_ACCESSRULE data
structures that it contains.
Access Rules are specified for a particular Type and Subtype combination within a given Repository, and
are established at the time of Subtype creation. The Access Rules for any Item within the Repository move
with the Repository and are available when required.
typedef struct_PST_ACCESSRULESET
    {

-continued

```
        DWORD cbSize;
        DWORD cRules;
        PST_ACCESSRULE *rgRules;
        }    PST_ACCESSRULESET;
```
Members cbSize
    The count of bytes in this data structure. It should be set to sizeof(PST_ACCESSRULESET).
cRules
    Specifies the count of Access Rule elements in the rgRules; array.
rgRules
    Contains an array of PST_ACCESSRULE elements.
See Also PST_ACCESSRULE, IPStore::CreateSubtype IPStore::ReadAccessRuleset,
IPStore::WriteAccessRuleset

PST_AUTHENTICODEDATA

A structure used to store the data for an Access Clause type of PST_AUTHENTICODE.
It may be pointed to by the pbClauseData member of the PST_ACCESSCLAUSE data structure.
```
typedef struct_PST_AUTHENTICODEDATA
        {
        DWORD cbSize;
        DWORD dwModifiers;
        LPCWSTR szRootCA;
        LPCWSTR szIssuer;
        LPCWSTR szPublisher;
        LPCWSTR szProgramName;
        }    PST_AUTHENTICODEDATA, *PPST_AUTHENTICODEDATA,
        *LPPST_AUTHENTICODEDATA;
```
Members cbSIze
    The count of bytes in this data structure. It should be set to sizeof(PST_AUTHENTICODEDATA).
dwModifiers
    Determines what calling code can have access to the protected data.
    Currently defined values for dwModifiers determine which one of a chain of callers must be
    verified, and are shown in the following table. Use, at most, one of this group of modifiers —they
    should not be logically ORed.
        dwModifiers
        PST_AC_SINGLE_CALLER
        PST_AC_TOP_LEVEL_CALLER
        PST_AC_IMMEDIATE_CALLER
    In order to get the best security, it is recommended that the application use the most specific
    modifier that applies. If possible, use the default, which is PST_AC_SINGLE_CALLER.
    PST_AC_SINGLE_CALLER
        Use this modifier when there is only a single level in the call chain to PStore, the executable, and
        there are no intermediate DLLs; called. To gain access to the protected data, the caller must pass
        the verification check. This is the default modifier, so if zero is used for dwModifiers, the same
        result will be achieved. This modifier achieves the highest level of security.
    PST_AC_TOP_LEVEL_CALLER
        Use this modifier when the protected data is to be accessed by a given executable but calls may
        go through other DLLs; as might be the case when an application must access the data through
        various DLLs, depending on settings within the application. In this case, the top level caller
        (executable) will be verified, but the intermediate DLLs; will not.
    PST_AC_IMMEDIATE_CALLER
        Use this modifier when the protected data is to be accessed by a given DLL that may be called
        by various executables. In this case, the immediate caller (DLL) will be verified, but any other
        intermediate DLLs and the executable will not.
szRootCA szIssuer
    Specifies the certificate issuer for the publisher (signer) of the application code. It is used to
    authenticate the signer. When NULL is specified, any issuer is acceptable.
szPublisher
    Specifies the publisher that must have signed the application code in order for an Access Clause to
    grant access. When NULL is specified, any publisher is acceptable.
szProgramName
    Specifies the application program name that may have access to the protected data. When NULL is
    specified, any application program name is acceptable.
See Also
PST_ACCESSCLAUSE

PST_BINARYCHECKDATA

A structure used to store the binary check data for an Access Clause check. It may be
pointed to by the pbClauseData member of the PST_ACCESSCLAUSE data structure.
```
typedef struct PST_BINARYCHECKDATA I
        DWORD cbSize;
        DWORD dwModifiers;
```

-continued

```
        LPCWSTR szFilePath;
    }   PST_BINARYCHECKDATA, *PPST_BINARYCHECKDATA, *LPPST_BINARYCHECKDATA;
```
Members cbSize
    The count of bytes in this data structure. It should be set to sizeof(PST_BINARYCHECKDATA).
dwModifiers
    Determines what calling code can have access to the protected data.
    Currently defined values for dwModifiers determine which one of a chain of callers must be verified,
    and are shown in the following table. Use, at most, one of this group of modifiers — they
    should not be logically ORed.
        dwModifiers
        PST_AC_SINGLE_CALLER
        PST_AC_TOP_LEVEL_CALLER
        PST_AC_IMMEDIATE_CALLER
    In order to get the best security, it is recommended that the application use the most specific
    modifier that applies. If possible, use the default, which is PST_AC_SINGLE_CALLER.
    PST_AC_SINGLE_CALLER
        Use this modifier when there is only a single level in the call chain to PStore, the executable, and
        there are no intermediate DLLs called. To gain access to the protected data, the caller must pass
        the verification check. This is the default modifier, so if zero is used for dwModifiers, the same
        result will be achieved. This modifier achieves the highest level of security.
    PST_AC_TOP_LEVEL_CALLER
        Use this modifier when the protected data is to be accessed by a given executable but calls may
        go through other DLL_s; as might be the case when an application must access the data through
        various DLLs, depending on settings within the application. In this case, the top level caller
        (executable) will be verified, but the intermediate DLLs will not.
    PST_AC_IMMEDIATE_CALLER
        Use this modifier when the protected data is to be accessed by a given DLL that may be called by
        various executables. In this case, the immediate caller (DLQ will be verified, but any other
        intermediate DLLs and the executable will not.
szFilePath
    Specifies the file that contains the binary check data to be used in the check of an Access Clause.
    The path specified should be the full path to the file. The file path can be obtained from the
    GetModuleFileName. (For more information, search the Microsoft Platform SDK for the function
    GotModuleFileName.) Note that the path must be in UNICODE format so Microsoft Windows 95
    users can call GetModuleFileNameA to get the ANSI version of the path. It can then be converted
    to UNICODE by calling MultiByteToWideChar. Windows NT users do the same as the Windows
    95 users, or they can just call GetModuleFileNameW, which returns the UNICODE path.
    When the dwModifier specified is PSTAC_SINGLE_CALLER or
    PST_AC_TOP_LEVEL_CALLER, a NULL may be passed for szFilePath and the appropriate
    szFilePath will be determined when the structure is initialized and stored.
See Also
PST_ACCESSCLAUSE

PST_PROMPTINFO

The PST_PROMPTINFO data structure is passed in API calls where a User Alert dialog box may be
generate7d, and the application developer wants to add prompt information to that dialog box. Note that
a dialog box is not necessarily displayed when an API call is made. For example, if the protected data
item has been opened with Openitem then accesses are automatically granted without need for a
User Alert until CloseItem is called.

```
typedef struct PST_PROMPTINFO {
        DWORD cbSize;
        DWORD dwPromptFlags;
        HWND hwndApp;
        LPCWSTR szPrompt;
    }   I PST_PROMPTINFO, *PPST_PROMPTINFO;
```
Members cbSize
    The count of bytes in this data structure. It should be set to sizeof(PST_PROMPTINFO).
dwPromptFlags,
    These flags specify the behavior of the how prompts are presented to the user.
    Currently defined prompt flags are shown in the following table.
        DwPromptFlags
        PST_PF_ALWAYS_SHOW
    PST_PF_ALWAYS_SHOW specifies that the application requests that the User Alert dialog box be
    shown always, even when the password is currently cached, or the PStore Provider default has
    been set to "silent."
hwndApp
    Specifies where the user alert dialog box appears on the screen. It must be passed for correct
    modality on dialogs. NULL may be passed to indicate that the desktop is the parent.
szPrompt
    The prompt string to be displayed in the dialog box.
See Also
IPStore::DeleteItem, IPStore::Openitem, IPStore::Readitem, IPStore::WriteItem -continued

PST_PROVIDERINFO

A structure returned by the GetInfo method of IPStore and by the Next method of
IEnumPStoreProviders. It contains information about the provider's identifier, capabilities supported,
and its friendly name.
typedef struct PST_PROVIDERINFO {
    DWORD cbSize;
    PST_PROVIDERID ID;
    PST_PROVIDERCAPABILITIES Capabilities;
    LPWSTR szProviderName,
} PST_PROVIDERINFO, *PPST_PROVIDERINFO;
Members cbSize
    The count of bytes in this data structure. It should be set to sizeof(PST_PROVIDERINFO).
ID
    Specifies the globally unique identifier (GUID) for this provider.
Capabilities
    Specifies the capabilities supported by this provider.
    Currently defined provider capabilities are shown in the following table.
        Flags
        PST_PC_HARDWARE
        PST_PC_MULITPLE_REPOSITORIES
        PST_PC_PCMCIA
        PST_PC_PFX
        PST_PC_ROAMABLE
        PST_PC_SMARTCARD
szProviderName
    A string specifying the friendly name of the provider.
See Also
IPStore::GetInfo, IEnumPStoreProviders::Next

PST_TYPEINFO

An extensible structure used when creating a type. It allows future types to be defined that contain
extra data associated with the type. For instance, an icon could be associated with the type.
typedef struct PST_TYPEINFO {
    DWORD cbSize;
    LPCWSTR szDisplayName;
} PST_TYPEINFO, *PPST_TYPEINFO;
Members cbSIze
    The count of bytes in this data structure. It should be set to sizeof(PST_TYPEINFO).
szDisplayName
    A string specifying the friendly name of the Type.
See Also
IPStore::CreateSubtype, IPStore::CreateType IPStore::GetSubtypeInfo IPStore::GetTypeInfo
dwFlags
    The flag values. This parameter is reserved for future use and should be set to zero in the interim to
    ensure future compatibility.
ppenum
    An indirect pointer to the returned enumeration object. See "Remarks" for details on de-allocating
    the enumeration object.
Return Values Returns an HRESULT. The following HRESULTS are returned for this method.

| Value | Meaning |
| --- | --- |
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks

The enumeration object returned in ppenum must be freed through a call to CoTaskMemFree or a
memory leak will occur. For more information, search the Microsoft Platform SDK for the function
CoTaskMemFree.
See Also
IPStore::EnumItems, IPStore::EnumSubtypes IPStore::GetInfo Retrieves information about the Protected Store interface object obtained from a call to
PStoreCreateInstance. Information about the provider's identifier, capabilities supported, and its
friendly name are returned. (A PST_PROVIDERINFO is also returned by PStoreEnumProviders.)

-continued

```
HRESULT GetInfo(
    PPST_PROVIDERINFO* ppProperties  // out
);
```
Parameters ppProperties
    A pointer to the PST_PROVIDERINFO structure returned. See "Remarks" for details on it's de-allocation.
Return Values Returns an HRESULT. The following HRESULTS are returned for this method.

| Value | Meaning |
| --- | --- |
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks

The PST_PROVIDERINFO returned in ppProviderProperties must be freed through a call to CoTaskMemFree or a memory leak will occur. For more information, search the Microsoft Platform SDK for the function CoTaskMemFree.
See Also
IPStore::GetSubtypeInfo, IPStore::GetTypeInfo IPStore::GetProvParam The GetProvParam method retrieves the parameters that govern the operations of a PStore Provider. This method is Provider dependent.
```
HRESULT GetProvParam(
    DWORD dwParam,              // in
    DWORD* pcbData,             // in /out
    BYTE** ppbData,             // out
    DWORD dwFlags               // in
);
```
Parameters dwParam
    The parameter number. Currently, no parameters are defined for which this get operation is applicable. However, there is a parameter defined for the set operation. See SetProvParam for details.
pcbData
    A pointer to the length of the parameter data buffer. Upon return, this address will contain the number of bytes of parameter data copied to the buffer.
ppbData
    An indirect pointer to the parameter data buffer allocated by this method. The method copies the specified parameter data to the allocated buffer. The form of this data will vary, depending on the parameter number. See "Remarks" for details on its de-allocation.
dwFlags
    This parameter is reserved for future use and should be set to zero in the interim to ensure future compatibility.
Return Values Returns an HRESULT. The following HRESULTS are returned for this method.

| Value | Meaning |
| --- | --- |
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks

The memory buffer returned in ppbData must be freed through a call to CoTaskMemFree or a memory leak will occur. For more information, search the Microsoft Platform SDK for the function CoTaskMemFree.
See Also
IPStore::SetProvParam IPStore::GetSubtypeInfo Retrieves the PST_TYPEINFO structure that corresponds to the Subtype specified.
Note that there are no access restrictions on obtaining Subtype info.
```
HRESULT GetSubtypeinfo(
    PST_KEY Key,                // in
```

```
    const GUID* pType,           // in
    const GUID* pSubtype,        // in
    PPST_TYPEINFO* ppInfo,       // out
    DWORD dwFlags                // in
);
```
Parameters Key
    Specifies the storage area for the Subtype for which the PST_TYPEINFO information is being retrieved, and is based on the computer being used or is based on an individual user (where there may be more than one user for this computer).
    Currently defined values for Key are shown in the following table.
        Key
        PST_KEY_CURRENT_USER
        PST_KEY_ILOCAL_MACHINE
pType
    Specifies a pointer to the Type for the specified Subtype for which data is being retrieved.
pSubtype
    A pointer to the specified Subtype for which data is being retrieved.
ppInfo
    A pointer to the PST_TYPEINFO structure retrieved. See "Remarks" for details on it's de-allocation.
dwFlags
    The flag values. This parameter is reserved for future use and should be set to zero in the interim to ensure future compatibility.
Return Values Returns an HRESULT. The following HRESULTS are returned for this method.

| Value | Meaning |
| --- | --- |
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks

The PST_TYPEINFO returned in ppInfo must be freed through a call to CoTaskMernFree or a memory leak will occur. For more information, search the Microsoft Platform SDK for the function CoTaskMemFree.
See Also
IPStore::GetInfo, IPStore::GetTypeInfo IPStore::GetTypeInfo Retrieves the PST_TYPEINFO structure for the Type specified.
Note that there are no access restrictions on obtaining Subtype information.
```
HRESULT GetTypeInfo(
    PST_KEY Key,                 // in
    const GUID* pType,           // in
    PPST_TYPEIINFO* ppInfo,      // out
    DWORD dwFlags                // in
);
```
Parameters Key
    Specifies ihe storage area for the Type for which the PST_TYPEINFO information is being retrieved, and is based on the computer being used or is based on an individual user (where there may be more than one user for this computer).
    Currently defined values for Key are shown in the following table.
        Key
        PST_KEY_CURRENT_USER
        PST_KEY_LOCAL_MACHINE
pType
    A pointer to the specified Type for which data is being retrieved.
ppInfo
    A pointer to the PST_TYPEINFO structure retrieved. See "Remarks" for details on it's de-allocation.
dwFlags
    The flag values. This parameter is reserved for future use and should be set to zero in the interim to ensure future compatibility.
Return Values Returns an HRESULT. The following HRESULTS are returned for this method.

| Value | Meaning |
| --- | --- |
| PST_E_OK | The method completed successfully. |
| PST_E_INVALID_HANDLE | An invalid handle was supplied to the protected storage server. Typically, indicates corruption or invalid handle state managed internally in the COM interface. |

-continued

| | |
|---|---|
| PST_E_FAIL | A general failure occurred within protected storage. Typically, indicates a memory allocation failure. |

Remarks

The PST_TYPEINFO returned in ppInfo must be freed through a call to CoTaskMemFree or a memory leak will occur. For more information, search the Microsoft Platform SDK for the function CoTaskMemFree.
See Also
IPStore::GetInfo, IPStore::GetSubtypeInfo IPStore::OpenItem This method opens the specified Item for the indicated access modes. The Item will remain open until CloseItem is called or the interface pointer is destroyed. If an Item is open, calls to ReadItem, WriteItem, DeleteItem, EnumItem will not require any user confirmation.
HRESULT OpenItem(
    PST_KEY Key,   // in
    const GUID* pItemType,   // in
    const GUID* pItemSubtype,   // in
    LPCWSTR szItemName,   // in
    PST_ACCESSMODE ModeFlags,   // in
    PST_PROMPTINFO* pPromptInfo,   // in
    DWORD dwFlags   // in
);
Parameters Key
    Specifies the storage area for the Item, and is based on the computer being used or is based on an individual user (where there may be more than one user for this computer).
    Currently defined values for Key are shown in the following table.
        Key
        PST_KEY_CURRENT_USER
        PST_KEY_LOCAL_MACHINE
pItemType
    Specifies a pointer to the Type of the Item being opened.
pItemSubtype
    Specifies a pointer to the Subtype for the Item being opened.
szItemName
    A string specifying the friendly name of the Item being opened. ModeFlags
    Specifies the modes for which the Item is being opened.
pPromptInfo
    Specifies a pointer to the PST_PROMPTINFO data structure that contains the prompting information for a dialog box that is displayed to the user to confirm the opening of the Item.
dwFlags
    The flag values. This parameter is reserved for future use and should be set to zero in the interim to ensure future compatibility.
Return Values Returns an HRESULT. The following HRESULTS are returned for this method.

| Value | Meaning |
|---|---|
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::CloseItem

IPStore:ReadAccessRuleset

This method reads and returns the PST_ACCESSRULESET structure for the given Subtype.
Note that in order to read the Access Rules, the caller must satisfy the existing Access Rules.
HRESULT ReadAccessRuleset(
    PST_KEY Key,   // in
    const GUID* pType,   // in
    const GUID* pSubtype,   // in
    PPST_ACCESSRULESET* ppRules,   // out
    DWORD dwFlags   // in
);
Parameters Key
    Specifies the storage area for the Access Rules, and is based on the computer being used or is -continued based on an individual user (where there may be more than one user for this computer).
    Currently defined values for Key are shown in the following table.
        Key
        PST_KEY_CURRENT_USER
        PST_KEY_LOCAL_MACHINE
pType
    Specifies a pointer to the specified Type for which the Access Rules are being read.
pSubtype
    Specifies a pointer to the specified Subtype for which the Access Rules are being read.
ppRules
    A pointer to the PST_ACCESSRULESET structure returned. See "Remarks" for details on its
    de-allocation.
dwFlags
    The flag values. This parameter is reserved for future use and should be set to zero in the interim to
    ensure future compatibility.
Return Values Returns an HRESULT. The following HRESULTS are returned for this method.

| Value | Meaning |
|---|---|
| PST_E_OK | The method completed successfully. |
| PST_E_NOTEXISTS | Indicates that the Type does not exist. |
| PST_E_NO_PERMISSIONS | Indicates that the user does not have the permission for this type of operation. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks

The PST_ACCESSRULESET returned in ppRules must be freed through a call to CoTaskMemFree
or a memory leak will occur. For more information, search the Microsoft Platform SDK for the
function
CoTaskMemFree.
See Also
IPStore::WriteAccessRuleset IPStore::ReadItem This method reads the specified Item and returns it in a data buffer.
Calling ReadItem may initiate user confirmation, depending on how the user has defined the Item.
HIRESULT ReadItem(
    PST KEY Key,                      H in
    con;t GUID* pItemType,        // in
    const GUID* pItemSubtype,   // in
    LPCWSTR szItemName,        // in
    DWORD* pcbData,            // in/out
    BYTE** ppbData,            // out
    PST_PROMPTINFO* pPromptInfo, // in
    DWORD dwFlags             // in
);
Parameters Key
    Specifies the storage area for the Item, and is based on the computer being used or is based on an
    individual user (where there may be more than one user for this computer).
    Currently defined values for Key are shown in the following table.
        Key
        PST_KEY_CURRENT_USER
        PST_KEY_LOCAL_MACHINE
pItemType
    Specifies a pointer to the Type of the Item being read.
pItemSubtype
    Specifies a pointer to the Subtype for the Item being read.
szItemName
    A string specifying the friendly name of the Item being read.
pcbData
    A pointer to the length of the data buffer. Upon return, this address will contain the number of bytes
    of data copied to the buffer.
ppbData
    An indirect pointer to the data buffer allocated by this method in which the Item is returned. This
    method will copy the specified Item to this buffer. See "Remarks" for details on de-allocating the
    buffer.
pPromptInfo
    Specifies a pointer to the PST_PROMPTINFO data structure that contains the prompting
    information for a dialog box that is displayed to the user to confirm the reading of the Item.
    The prompt string and any other application supplied information appears in the application prompt area
    in the user confirmation dialog box when user confirmation is required. The rest of the confirmation -continued dialog is not controlled by the application.
dwFlags
    The flag values.
    Currently defined values for dwFlags are shown in the following table.
        dwFlags
        PST_UNRESTRICTED_ITEMDATA
    PST_UNRESTRICTED_ITEMDATA specified requests that the Provider read unprotected data
    associated with the Item, to which access is unrestricted. If the Item does not exist, an error will be
    returned.
Return Values Returns an HRESULT. The following HRESULTS are returned for this method.

| Value | Meaning |
|---|---|
| PST_E_OK | The method completed successfully. |
| PST_E_NO_PERMISSIONS | Indicates that the user does not have the permission for this type of operation. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks

The memory buffer returned in ppbData must be freed through a call to CoTaskMemFree or a memory
leak will occur. For more information, search the Microsoft Platform SDK for the function
CoTaskMemFree.
See Also
IPStore::WriteItem IPStore::SetProvParam The SetProvParam method sets the parameters that govern the operations of a PStore Provider. This
method is Provider dependent.
HRESULT SetProvParam(
    DWORD dwParam,        // in
    DWORD cbData,         // in
    BYTE* pbData,         // in
    DWORD dwFlags         // in
);
Parameters dwParam
    The parameter number. See "Remarks" section for a list of valid parameters.
cbData
    The length of the parameter data buffer. Before calling this method, the caller should set this parameter to the
length, in bytes, of the ppbData buffer.
pbData
    A pointer to the parameter data buffer. Place the parameter data in this buffer before calling
    SetProvParam. The form of this data will vary, depending on the parameter number.
dwFlags
    The flag values. This parameter is reserved for future use and should be set to zero in the interim to
    ensure future compatibility.
Return Values Returns an HRESULT. The following HRESULTS are returned for this method.

| Value | Meaning |
|---|---|
| PST_E_OK | The method completed successfully. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

Remarks dwParam can be set to PST_PP_FLUSH_PW_CACHE to flush the password cache. As a result, any
passwords the user has selected to be remembered (by checking the appropriate box in a confirmation
dialog) are flushed from memory, and will need to be re_entered the next time they are used in an
operation.
See Also
IPStore::GetProvParam IPStore::WriteAccessRuleset This method sets the PST_ACCESSRULESET for the given Type and Subtype.
Note that in order to set new Access Rules, the caller must satisfy the existing Access Rules.
HRESULT WriteAccessRuleset(
    PST KEY Key,         // in -continued

```
    const GUID* pType,              // in
    const GUID* pSubtype,           // in
    PST_ACCESSRULESET_pRules,       // in
    DWORD dwFlags                   // in
);
```

Parameters

Key
    Specifies the storage area for the Access Rules, and is based on the computer being used or is based on an individual user (where there may be more than one user for this computer). Currently defined values for Key are shown in the following table.
        Key
        PST_KEY_CURRENT_USER
        PST_KEY_LOCAL_MACHINE pType
    Specifies a pointer to the specified Type for which the Access Rules are being set.

pSubtype
    Specifies a pointer to the specified Subtype for which the Access Rules are being set.

pRules
    A pointer to the PST_ACCESSRULESET structure that contains the new value for the Access Rules.
    If a NULL pointer for pRules is passed in, it is interpreted as an empty Access Rule Set and there are no application access restrictions. All applications are allowed access.

dwFlags
    The flag values. This parameter is reserved for future use and should be set to zero in the interim to ensure future compatibility.

Return Values

Returns an HRESULT. The following HRESULTS are returned for this method.

| Value | Meaning |
| --- | --- |
| PST_E_OK | The method completed successfully. |
| PST_E_NO_PERMISSIONS | Indicates that the user does not have the permission for this type of operation. |
| PST_E_INVALID_RULESET | The ruleset specified was invalid. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::ReadAccessRuleset

IPStore::WriteItem

This method stores the specified data under the specified Type and Subtype, and with the specified name. If the Item already exists, and the PST_NO_OVERWRITE flag is specified, then the Item is not written and an error is generated.

```
HRESULT WriteItem(
    PST_KEY Key,                            // in
    const GUID* pItemType,                  // in
    const GUID* pItemSubtype,               // in
    LPCWSTR szItemName,                     // in
    DWORD cbData,                           // in
    BYTE* pbData,                           // in
    PST PROMPTINFO* pPromptInfo,            // in
    DWORD dwDefaultConfirmationStyle,       // in
    DWORD dwFlags                           // in
);
```

Parameters

Key
    Specifies the storage area for the Item, and is based on the computer being used or is based on an individual user (where there may be more than one user for this computer). Currently defined values for Key are shown in the following table.
        Key
        PST_KEY_CURRENT_USER
        PST_KEY_LOCAL_MACHINE pItemType
    Specifies a pointer to the Type of the Item being set.

pItemSubtype
    Specifies a pointer to the Subtype for the Item being set.

szItemName
    A string specifying the friendly name of the Item being set.

cbData
    The length of the data buffer. Before Galling this method, the caller should set this parameter to the length, in bytes, of the pbData buffer.

pbData
    A pointer to the data buffer that contains the specified Item to be set.

-continued pPromptInfo
    Specifies a pointer to the PST_PROMPTINFO data structure that contains the prompting
    information for a dialog box that is displayed to the user to confirm the reading of the item.
dwDefaultConfirmationStyle
    Specifies the default confirmation behavior to be used for prompting the user.
    If the item does not yet exist, the application may specify a default confirmation behavior to be used for this
    item, via dwDetauffConfirmationStyle. Note that, although there are many circumstances
    under which the user will not be prompted when an Item is first written, this is not guaranteed.
    Therefore, an appropriate pPromptInfo parameter should always be passed in.
    Currently defined values for dwDefauftConfirmationStyleare shown in the following table.
        dwDefaultConfirmationStyle
        PST_CF_DEFAULT
        PST_CF_NONE
    PST_CF_DEFAULT specifies that the default confirmation behavior be used, which may be set by
    the user or administrator. For the system Provider, the default depends on whether the user is
    logged in (typical in corporate settings) or not (typical in home settings). For the PStore
    System Provider, if the user is logged in, the Windows password will be used as the default
    confirmation behavior; otherwise OK / Cancel will be used.
    PST_CF_NONE specifies that the application requests silent access, that is, no user confirmation is
    required for accessing items of this Type. Note that the Provider is not required to honor this
    request. If honored, the prompt will not be displayed (no Ul will be presented in creating this
    Subtype).
dwFlags
    The flag values.
    Currently defined values for dwFlags are shown in the following table.
        dwFlags
        PST_NO_OVERWRITE
        PST_UNRESTRICTED_ITEMDATA
    PST_NO_OVERWRITE specifies that if the Item already exists, the Item will not be written and the
    error PST_E_EXISTS will be returned. One use of this flag is, as in the case of per_Item
    confirmation, to ensure that another application hasn't already created the Item with inappropriate
    confirmation. (it is also possible to find out whether the Item exists by enumerating Items in the
    Subtype). Opening the Item will not nullify the NO_OVERWRITE protection. Unrestricted Item data
    can still be added, despite the NO_OVERWRITE protection.
    PST_UNRESTRICTED_ITEMDATA requests that the Provider write unprotected data associated
    with The Item, to which access is unrestricted. If the Item does not yet exist (having been written without this
    flag) an error will be returned.
    For items with an unrestricted data stream the following applies:
        Deleting the item also deletes it's unrestricted data stream.
        Combining PST_UNRESTRICTED_ITEMDATA with PST_NO_OVERWRITE has no effect on
        the overwrite characteristics of the unrestricted item data stream.
Return Values Returns an HRESULT. The following HRESULTS are returned for this method.

| Value | Meaning |
| --- | --- |
| PST_E_OK | The method completed successfully. |
| PST_E_NOTEXISTS | Indicates the Item's Type and Subtype do not currently exist. |
| PST_E_NO_PERMISSIONS | Indicates that the user does not have permission for this type of operation. |
| PST_E_INVALID_HANDLE | An invalid handle was supplied to the protected storage server. Typically, indicates corruption or invalid handle state managed internally in the COM interface. |
| PST_E_FAIL | A general failure occurred within protected storage. Typically, indicates a memory allocation failure. |

See Also
IPStore::Read Item

Protected Storage Data Structures

The following data structures are used by the functions and methods contained in the Microsoft®
Protected Storage API. The structures are listed alphabetically. These structures can be found in pstore.h.
This structure contains a single instance of access clause data. It is used at the time of Subtype
creation, and establishes rules governing which applications and users should be granted access to
protected data.
More than one access clause can be used to establish a single access rule. This is accomplished by
adding additional PST_ACCESSCLAUSE structures to the rgClauses array contained in the
PST_ACCESSRULE data structure.
typedef struct_PST_ACCESSCLAUSE
    {
    DWORD cbSize;
    PST_ACCESSCLAUSETYPE ClauseType;
    DWORD cbClauseData;
    VOID* pbClauseData;
    }    PST_ACCESSCLAUSE;

-continued

Members cbSize
    The count of bytes in this data structure. It should be set to sizoof(PST_ACCESSCLAUSE).
ClauseType
    Specifies the type of the clause data contained in the pbClauseData member.
    Currently defined access clause types are shown in the following table, and described in the text that follows it.
        ClauseType
        PST_AUTHENTICODE
        PST_BINARY_CHECK
        PST_SECURITY_DESCRIPTOR
PST_AUTHENTICODE
    A ClauseType of PST_AUTHENTICODE specifies that pbClauseData points to a
    PST_AUTHENTICODEDATA data structure.
    If the PST_AUTHENTICODE clause type was specified at the time of Subtype creation, a check
    will be made to see if the requesting application was signed or not, and if signed, by whom. The
    clause may specify a particular root, certificate issuer, publisher (signer), or program name.
    Access will not be granted unless the specified criteria are met. Not all of the criteria need be
    specified for access. If none are specified, the verification amounts to allowing any Authenticode
    verified application or module access to the data. Authenticode checking uses Wintrust.dll to
    verify the binary of the module under inspection. For more information on Authenticode, search
    for "Authenticode" on http://www.microsoft.com.
    Note that applications may provide additional checking of their own. For instance, an applicatio
    such as the Java virtual machine may choose to verify that Java classes are being run.
PST_BINARY_CHECK
    A ClauseType of PST_BINARY_CHECK specifies that pbClauseData points to a
    PST_BINARYCHECKDATA data structure.
    When an application is installed, or loaded, PStore can be prompted to take a "snapshot" (hash) of the binary
    pattern for that application. Then, when the application is loaded at a later time, PStore again takes the hash of
    the application and compares the original hash with the one just taken. Only if the two hashes match will
    PStore allow the application access to the specified data. Thus, if the application has changed since it was
    installed, and therefore the possibility
    exists that it has been tampered with, the data will be protected.
PST_SECURITY_DESCRIPTOR
    A ClauseType of PST_SECURITY_DESCRIPTOR specifies that pbClauseData points to
    the Microsoft Windows NT® security descriptor.
    The PST_SECURITY_DESCRIPTOR clause is intended to allow access only to specified users
    or groups, and is enforced only on Windows NT platforms. If this clause is applied on a Microsoft
    Windowse 95® platform, it will be ignored. This clause gets the necessary information about the
    current user and groups from the ACLs contained in the Windows NT security descriptor. Setting
    the SACL in the security descriptor has no effect in this version of PStore. Audit is supported
    natively at a higher level in PStore (e.g., all actions such as creating Types and Subtypes, and
    Item read/write and deletion can all be audited).
cbClauseData
    Specifies the count of bytes in the data pointed to by pbClauseData.
pbClauseData
    A pointer to the data specified by the ClauseType.
See Also
PST_ACCESSRULE, PST_AUTHENTICODEDATA, PST_BINARYCHECKDATA

PST_ACCESSRULE

This structure contains an array of PST_ACCESSCLAUSE data structures. This grouping together of
Access Clause data structures forms an Access Rule. For an Access Rule to be considered granted,
all of the individual Access Clauses that it contains must grant access. In other words, an Access Rule
is considered granted based on a logical AND of all the Access Clauses that it contains.
More than one access rule can be applied to a given Subtype. To do this, PST_ACCESSRULE data
structures are combined in an array as part of the PST_ACCESSRULESET data structure. If more
than one rule is added to the array, access to the protected data will be granted if any one of the rules
grant access, but only for the mode of access granted in that rule. In other words, the rules are
evaluated on a logical OR basis, and the first one in the array is evaluated first.
typedef struct_PST_ACCESSRULE

```
    {
    DWORD cbSize;
    PST_ACCESSMODE AccessModeFlags;
    DWORD cClauses;
    PST_ACCESSCLAUSE *rgClauses;
    }    PST_ACCESSRULE;
```
Members cbSize
    The count of bytes in this data structure. It should be set to sizoof(PST_ACCESSRULE).
AccessModeFlags
    Each access rule has an access mode flag associated with it. This flag determines the type of
    access granted if all of the clauses are satisfied. There are two Access Modes currently defined,
    Read and Write access. Read allows only the retrieving of protected data, whereas Write only
    allows the storing of protected data. The Read and Write access modes may be combined with a
    bitwise OR operation (PST_READ I PST_WRITE) to allow both reading and writing accesses. Other
    modes may be added in the future.

-continued

Currently defined values for AccessModeFlags are shown in the following table:
        AccessModeFlags
        PST_READ
        PST_WRITE
cClauses
    Specifies the count of Access Clause elements in the rgClauses array.
rgClauses
    Contains an array of PST_ACCESSCLAUSE elements.
See Also
PST_ACCESSCLAUSE, PST_ACCESSRULESET

PST_ACCESSRULESET

Access to protected data by applications is controlled through the use of Access Rules.
This structure contains an array of PST_ACCESSRULE data structures. This grouping together of
access rule data structures forms the Access Rules. The Access Rules are considered to be granted if
any of the individual PST_ACCESSRULE data structures that it contains grant access. In other words,
the Access Rules are considered granted based on a logical OR of all the PST_ACCESSRULE data
structures that it contains.
Access Rules are specified for a particular Type and Subtype combination within a given Repository, and are established at the time of Subtype creation. The Access Rules for any Item within the Repository move with the Repository and are available when required.
typedef struct_PST_ACCESSRULESET
        {
        DWORD cbSize;
        DWORD cRules;
        PST_ACCESSRULE *rgRules;
        }    PST_ACCESSRULESET;
Members cbSize
    The count of bytes in this data structure. It should be set to sizeof(PST_ACCESSRULESET).
cRules
    Specifies the count of Access Rule elements in the rgRules; array.
rgRules
    Contains an array of PST_ACCESSRULE elements.
See Also PST_ACCESSRULE, IPStore::CreateSubtype IPStore::ReadAccessRuleset,
IPStore::WriteAccessRuleset

PST_AUTHENTICODEDATA

A structure used to store the data for an Access Clause type of PST_AUTHENTICODE. It may be pointed to by
the pbClauseData member of the PST_ACCESSCLAUSE data structure.
typedef struct_PST_AUTHENTICODEDATA
        {
        DWORD cbSize;
        DWORD dwModifiers;
        LPCWSTR szRootCA;
        LPCWSTR szIssuer;
        LPCWSTR szPublisher;
        LPCWSTR szProgramName;
        }    PST_AUTHENTICODEDATA, *PPST_AUTHENTICODEDATA, *LPPST_
        AUTHENTICODEDATA;
Members cbSIze
    The count of bytes in this data structure. It should be set to sizeof(PST_AUTHENTICODEDATA).
dwModifiers
    Determines what calling code can have access to the protected data.
    Currently defined values for dwModifiers determine which one of a chain of callers must be
    verified, and are shown in the following table. Use, at most, one of this group of modifiers —they
    should not be logically ORed.
        dwModifiers
        PST_AC_SINGLE_CALLER
        PST_AC_TOP_LEVEL_CALLER
        PST_AC_IMMEDIATE_CALLER
    In order to get the best security, it is recommended that the application use the most specific
    modifier that applies. If possible, use the default, which is PST_AC_SINGLE_CALLER.
    PST_AC_SINGLE_CALLER
        Use this modifier when there is only a single level in the call chain to PStore, the executable, and
        there are no intermediate DLLs; called. To gain access to the protected data, the caller must pass
        the verification check. This is the default modifier, so if zero is used for dwModifiers, the same
        result will be achieved. This modifier achieves the highest level of security.
    PST_AC_TOP_LEVEL_CALLER
        Use this modifier when the protected data is to be accessed by a given executable but calls may
        go through other DLLs; as might be the case when an application must access the data through
        various DLLs, depending on settings within the application. In this case, the top level caller
        (executable) will be verified, but the intermediate DLLs; will not.
    PST_AC_IMMEDIATE_CALLER -continued Use this modifier when the protected data is to be accessed by a given DLL that may be called by various executables. In this case, the immediate caller (DLL) will be verified, but any other intermediate DLLs and the executable will not.
szRootCA szIssuer
    Specifies the certificate issuer for the publisher (signer) of the application code. It is used to authenticate the signer. When NULL is specified, any issuer is acceptable.
szPublisher
    Specifies the publisher that must have signed the application code in order for an Access Clause to grant access. When NULL is specified, any publisher is acceptable.
szProgramName
    Specifies the application program name that may have access to the protected data. When NULL is specified, any application program name is acceptable.
See Also
PST_ACCESSCLAUSE

PST_BINARYCHECKDATA

A structure used to store the binary check data for an Access Clause check. It may be pointed to by the pbClauseData member of the PST_ACCESSCLAUSE data structure.
typedef struct PST_BINARYCHECKDATA I
    DWORD cbSize;
    DWORD dwModifiers;
    LPCWSTR szFilePath;
    } PST_BINARYCHECKDATA, *PPST_BINARYCHECKDATA, *LPPST_BINARYCHECKDATA;
Members cbSize
    The count of bytes in this data structure. It should be set to sizeof(PST_BINARYCHECKDATA).
dwModifiers
    Determines what calling code can have access to the protected data.
    Currently defined values for dwModifiers determine which one of a chain of callers must be verified, and are shown in the following table. Use, at most, one of this group of modifiers — they should not be logically ORed.
        dwModifiers
        PST_AC_SINGLE_CALLER
        PST_AC_TOP_LEVEL_CALLER
        PST_AC_IMMEDIATE_CALLER
    In order to get the best security, it is recommended that the application use the most specific modifier that applies. If possible, use the default, which is PST_AC_SINGLE_CALLER.
    PST_AC_SINGLE_CALLER
        Use this modifier when there is only a single level in the call chain to PStore, the executable, and there are no intermediate DLLs called. To gain access to the protected data, the caller must pass the verification check. This is the default modifier, so if zero is used for dwModifiers, the same result will be achieved. This modifier achieves the highest level of security.
    PST_AC_TOP_LEVEL_CALLER
        Use this modifier when the protected data is to be accessed by a given executable but calls may go through other DLL_s; as might be the case when an application must access the data through various DLLs, depending on settings within the application. In this case, the top level caller (executable) will be verified, but the intermediate DLLs will not.
    PST_AC_IMMEDIATE_CALLER
        Use this modifier when the protected data is to be accessed by a given DLL that may be called by various executables. In this case, the immediate caller (DLQ will be verified, but any other intermediate DLI_s and the executable will not.
szFilePath
    Specifies the file that contains the binary check data to be used in the check of an Access Clause. The path specified should be the full path to the file. The file path can be obtained from the GetModuleFileName. (For more information, search the Microsoft Platform SDK for the function GotModuleFileName.) Note that the path must be in UNICODE format so Microsoft Windows 95 users can call GetModuleFileNameA to get the ANSI version of the path. It can then be converted to UNICODE by calling MultiByteToWideChar. Windows NT users do the same as the Windows 95 users, or they can just call GetModuleFileNameW, which returns the UNICODE path.
    When the dwModifier specified is PSTAC_SINGLE_CALLER or
    PST_AC_ TOP_LEVEL_CALLER, a NULL may be passed for szFilePath and the appropriate SZfILEpATH will be determined when the structure is initialized and stored.
See Also
PST_ACCESSCLAUSE

PST_PROMPTINFO

The PST_PROMPTINFO data structure is passed in API calls where a User Alert dialog box may be generate7d, and the application developer wants to add prompt information to that dialog box. Note that a dialog box is not necessarily displayed when an API call is made. For example, if the protected data item has been opened with Openitem then accesses are automatically granted without need for a User Alert until CloseItem is called.
typedef struct PST_PROMPTINFO {
    DWORD cbSize;
    DWORD dwPromptFlags;

```
            HWND hwndApp;
            LPCWSTR szPrompt;
    }   I PST_PROMPTINFO, *PPST_PROMPTINFO;
```
Members cbSIze
    The count of bytes in this data structure. It should be set to sizeof(PST_PROMPTINFO).
dwPromptFlags,
    These flags specify the behavior of the how prompts are presented to the user.
    Currently defined prompt flags are shown in the following table.
        DwPromptFlags
        PST_PF_ALWAYS_SHOW
    PST_PF_ALWAYS_SHOW specifies that the application requests that the User Alert dialog box be
    shown always, even when the password is currently cached, or the PStore Provider default has
    been set to "silent."
hwndApp
    Specifies where the user alert dialog box appears on the screen. It must be passed for correct
    modality on dialogs. NULL may be passed to indicate that the desktop is the parent.
szPrompt
    The prompt string to be displayed in the dialog box.
See Also
IPStore::DeleteItem, IPStore::Openitem, IPStore::Readitem, IPStore::WriteItem

PST_PROVIDERINFO

A structure returned by the GetInfo method of IPStore and by the Next method of
IEnumPStoreProviders. It contains information about the provider's identifier, capabilities supported,
and its friendly name.
```
typedef struct PST_PROVIDERINFO {
        DWORD cbSize;
        PST_PROVIDERID ID;
        PST_PROVIDERCAPABILITIES Capabilities;
        LPWSTR szProviderName,
    }   PST_PROVIDERINFO, *PPST_PROVIDERINFO;
```
Members cbSize
    The count of bytes in this data structure. It should be set to sizeof(PST_PROVIDERINFO).
ID
    Specifies the globally unique identifier (GUID) for this provider.
Capabilities
    Specifies the capabilities supported by this provider.
    Currently defined provider capabilities are shown in the following table.
        Flags
        PST_PC_HARDWARE
        PST_PC_MULITPLE_REPOSITORIES
        PST_PC_PCMCIA
        PST_PC_PFX
        PST_PC_ROAMABLE
        PST_PC_SMARTCARD
szProviderName
    A string specifying the friendly name of the provider.
See Also
IPStore::GetInfo, IEnumPStoreProviders::Next

PST_TYPEINFO

An extensible structure used when creating a type. It allows future types to be defined that contain
extra data associated with the type. For instance, an icon could be associated with the type.
```
typedef struct PST_TYPEINFO {
        DWORD cbSize;
        LPCWSTR szDisplayName;
    }   PST_TYPEINFO, *PPST_TYPEINFO;
```
Members cbSIze
    The count of bytes in this data structure. It should be set to sizeof(PST_TYPEINFO).
szDisplayName
    A string specifying the friendly name of the Type.
See Also
IPStore::CreateSubtype, IPStore::CreateType IPStore::GetSubtypeInfo IPStore::GetTypeInfo

Conclusion

The invention provides a versatile and efficient architecture that provides a number of advantages over the prior art. One significant advantage is that different application programs can utilize a single, provided server to store core data secrets in a central storage area. This promotes consistency among the applications and removes significant overhead from the applications. The user interface is one area that benefits from the consistency provided by the storage system described above, since user prompts are generated by the system rather than by the individual application programs. Storing data items in a uniform manner also allows them to be managed by a single management program that is independent of the application programs themselves.

Another significant advantage of the invention is that the underlying details of securing data items are hidden from calling application programs. Thus, program developers do not have to implement sophisticated security measures; such measures can be implemented with simple calls to the storage system described herein. An added benefit is that new technologies such as smart cards will be available to application programs without extensive reprogramming.

The invention protects secrets from user-oriented and software-oriented attacks, including attacks from viruses. Significantly, access control is managed outside the application programs that generate and access data items. Because applications do not have direct access to keying material or other control data, access to one piece of data does not imply access to any other data. Furthermore, the storage system itself does not retain the information required to decrypt stored data items. Rather, the user must be present and must supply a correct password to allow data decryption.

A flurther important benefit of the invention is that users are not forced to explicitly enter passwords when data access is required. Rather, user authentication is performed once, when the user logs on to the computer or network. This logon information is used for both user authentication and to derive keys for data encryption and decryption.

Although the invention has been described in language specific to structural features and/or methodological steps, it is to be understood that the invention defined in the appended claims is not necessarily limited to the specific features or steps described. Rather, the specific features and steps are disclosed as exemplary forms of implementing the claimed invention.

What is claimed is:

1. A system for storing data items, comprising:
    a storage server that receives data items from application programs and that returns such data items in response to requests from application programs;
    at least one data protection provider that stores the data items on a storage medium and protects the data items from unauthorized access;
    wherein a plurality of different data protection providers can be registered for use by the storage server, the different data protection providers protecting the data items using different data protection technologies based on user authentication;
    wherein the storage server provides the data items to one of the data protection providers for protected storage of the data items in accordance with the protection technology used by said one of the data protection providers; and
    wherein the storage server returns the data items only to authorized requestors.

2. A system as recited in claim 1, wherein a plurality of different authentication providers can be registered for use by the storage server to identify current computer users, thereby allowing new authentication providers to be easily installed and registered with the storage server.

3. A system as recited in claim 1, wherein the storage server executes in a different address space than the application programs.

4. A system as recited in claim 1, wherein the storage server executes in a different address space than the application programs and is called via remote procedure calls.

5. A system as recited in claim 1, wherein said one or more authentication providers include an authentication provider that identifies users based on a previous network authentication.

6. A system as recited in claim 1, wherein said plurality of different data protection providers include a data protection provider that encrypts and decrypts data items.

7. A system as recited in claim 1, wherein said plurality of different data protection providers include a data protection provider that verifies the integrity of data items when retrieving them.

8. A system as recited in claim 1, wherein said plurality of different data protection providers include a data protection provider that encrypts and decrypts data items using one or more keys that are derived from authentication of the current computer user.

9. A system as recited in claim 1, wherein said plurality of different data protection providers include a data protection provider that encrypts and decrypts data items using one or more keys that are derived from a user-supplied code, and wherein the storage server prompts the current computer user for the user-supplied code.

10. A system as recited in claim 1, wherein said plurality of different data protection providers include a data protection provider that encrypts and decrypts data items using one or more keys that are derived from a network logon code supplied by the current computer user.

11. A system as recited in claim 1, wherein said plurality of different data protection providers include a data protection provider that securely stores and retrieves data items using one or more keys that are derived from a user-supplied code.

12. A system as recited in claim 1, wherein said plurality of different data protection providers include a data protection provider that securely stores and retrieves data items using one or more keys that are derived from a network logon code supplied by the current computer user.

13. A system as recited in claim 1, wherein said plurality of different data protection providers include a data protection provider that stores data items in accordance with the following steps:
    encrypting individual data items with item keys;
    encrypting the item keys with a master key;
    encrypting the master key with a user key that is derived from a user-supplied code;
    storing the encrypted individual data items, the encrypted item keys, and the encrypted master key.

14. A system as recited in claim 1, wherein said plurality of different data protection providers include a data protection provider that stores data items in accordance with the following steps:
    encrypting individual data items with item keys;
    generating item authentication codes for individual data items using item authentication keys;
    encrypting the item keys and the item authentication keys with a master key;
    generating key authentication codes for item keys and item authentication keys using a master authentication key;
    encrypting the master key and the master authentication key with a user key that is derived from a user-supplied code;
    storing the encrypted individual data items, the item authentication codes, the encrypted item keys, the encrypted item authentication keys, the key authentication codes, the encrypted master key, and the encrypted master authentication key.

15. A system as recited in claim 1, wherein said plurality of different data protection providers include a data protection provider that retrieves data items in accordance with the Is following steps:
   retrieving encrypted individual data items, encrypted item keys corresponding to the encrypted individual data items, and an encrypted master key;
   decrypting the encrypted master key with a user key that is derived from a user-supplied code;
   decrypting the encrypted item keys with the decrypted master key;
   decrypting the encrypted individual data items with the corresponding decrypted item keys.

16. A system as recited in claim 1, wherein the storage server allows access to individual data items depending on the current computer user.

17. A system as recited in claim 1, wherein the storage server returns requested data items only to authorized requesting application programs.

18. A system as recited in claim 1, wherein the storage server returns requested data items only to authorized requesting application programs, and wherein the storage server authenticates requesting application programs before returning individual data items.

19. A system as recited in claim 1, wherein the storage server returns requested data items only to authorized requesting application programs, and wherein the storage server authenticates the requesting application program using public key cryptography before returning individual data items.

20. A system as recited in claim 1, wherein the storage server is responsive to application program requests to present user dialogs allowing the current computer user to specify passwords to be used by the storage provider to securely store and retrieve data items.

21. A system as recited in claim 1, wherein the storage server, the data protection providers, and the authentication providers are individually signed by a private cryptographic key that corresponds to a public cryptographic key; the storage server, the data protection providers, and the authentication providers being configured to verify each others' signatures using the public cryptographic key.

22. A system as recited in claim 1, wherein the storage server implements a set of interface methods that are exposed to application programs, the interface methods performing respective functions comprising:
   opening a specified data item;
   closing a specified data item;
   creating a data item type;
   deleting a data item type; p1 creating a data item subtype;
   deleting a data item subtype;
   deleting a data item;
   retrieving a structure that corresponds to a specified data item subtype;
   retrieving a structure that corresponds to a specified data item type;
   establishing an access rule set for a specified data item subtype;
   returning an access rule set for a specified data item subtype;
   returning a specified data item;
   writing a specified data item with a specified name as a specified data item type and data item subtype.

23. A system for storing data items, comprising:
   a storage server that receives data items from application programs and that returns such data items in response to requests from application programs, wherein the storage server executes in a different address space than the application programs and is called via remote procedure calls;
   at least one data protection provider that stores the data items on a storage medium and protects the data items from unauthorized access;
   wherein a plurality of different data protection providers can be registered for use by the storage server, the different data protection providers protecting the data items using different data protection technologies;
   wherein said at least one data protection provider encrypts data items before storing them using one or more keys that are derived from authentication of the current computer user, the data protection provider verifying the integrity of data items when retrieving them;
   wherein the storage server provides the data items to one of the data protection providers for protected storage of the data items in accordance with the protection technology used by said one of the data protection providers;
   an authentication provider that is called by the storage server to identify current computer users, wherein the authentication provider identifies users based on a previous operating system logon procedure; and
   wherein the storage server returns the data items only to authorized requesters.

24. A system as recited in claim 23, wherein said one or more keys are derived from an operating system logon code supplied by the current computer user.

25. A system as recited in claim 23, wherein said one or more keys are derived from a user-supplied code.

26. A system as recited in claim 23, wherein the data protection provider stores data items in accordance with the following steps:
   encrypting individual data items with item keys;
   encrypting the item keys with a master key;
   encrypting the master key with a user key that is derived from a user-supplied code;
   storing the encrypted individual data items, the encrypted item keys, and the encrypted master key.

27. A system as recited in claim 23, wherein the data protection provider stores data items in accordance with the following steps:
   encrypting individual data items with item keys;
   generating item authentication codes for individual data items using item authentication keys;
   encrypting the item keys and the item authentication keys with a master key;
   generating key authentication codes for item keys and item authentication keys using a master authentication key;
   encrypting the master key and the master authentication key with a user key that is derived from a user-supplied code;
   storing the encrypted individual data items, the item authentication codes, the encrypted item keys, the encrypted item authentication keys, the key authentication codes, the encrypted master key, and the encrypted master authentication key.

28. A system as recited in claim 23, wherein the data protection provider retrieves data items in accordance with the following steps:

retrieving encrypted individual data items, encrypted item keys corresponding to the encrypted individual data items, and an encrypted master key;

decrypting the encrypted master key with a user key that is derived from a user-supplied code;

decrypting the encrypted item keys with the decrypted master key;

decrypting the encrypted individual data items with the corresponding decrypted item keys.

29. A system as recited in claim 23, wherein the storage server returns requested data items only to authorized requesting application programs.

30. A system as recited in claim 23, wherein the storage server authenticates requesting application programs before returning individual data items.

31. A system as recited in claim 23, wherein the storage server authenticates requesting application programs using public key cryptography before returning individual data items.

32. A system as recited in claim 23, wherein the storage server is responsive to application program requests to present user dialogs allowing the current computer user to specify passwords to be used by the data protection provider to securely store and retrieve data items.

33. A system as recited in claim 23, wherein the storage server and the data protection providers are individually signed by a private cryptographic key that corresponds to a public cryptographic key; the storage server and the data protection providers being configured to verify each others' signatures using the public cryptographic key.

34. A method of storing user and application secrets and for protecting them from unauthorized access, comprising the following steps:

receiving individual data items from application programs;

encrypting the data items using one or more keys that are derived from one or more user-supplied passwords;

storing the encrypted data items;

retrieving and decrypting the stored encrypted data items in response to requests from application programs;

returning requested data items only to authorized requesting application programs;

exposing a set of interface methods, the interface methods performing respective functions comprising:

opening a specified data item;
closing a specified data item;
creating a data item type;
deleting a data item type;
creating a data item subtype;
deleting a data item subtype;
deleting a data item;
retrieving a structure that corresponds to a specified data item subtype;
retrieving a structure that corresponds to a specified data item type;
establishing an access rule set for a specified data item subtype;
returning an access rule set for a specified data item subtype;
returning a specified data item;
writing a specified data item with a specified name as a specified data item type and data item subtype.

35. A method of storing user and application secrets and for protecting them from unauthorized access, comprising the following steps:

receiving individual data items from different application programs;

encrypting the data items;

storing the encrypted data items from the different application programs in a common storage area;

exposing a set of interface methods, the interface methods performing respective functions comprising:

opening a specified data item;
closing a specified data item;
creating a data item type;
deleting a data item type;
creating a data item subtype;
deleting a data item subtype;
deleting a data item;
retrieving a structure that corresponds to a specified data item subtvpe;
retrieving a structure that corresponds to a specified data item type;
establishing an access rule set for a specified data item subtype;
returning an access rule set for a specified data item subtype;
returning a specified data item;
writing a specified data item with a specified name as a specified data item type and data item subtype.

36. A method as recited in claim 35, comprising a further step of allowing access to individual data items depending on the current computer user.

37. A method as recited in claim 35, comprising a further step of returning requested data items only to authorized requesting application programs.

38. A method as recited in claim 35, comprising the following additional steps:

returning requested data items only to authorized requesting application programs;

authenticating requesting application programs before returning individual data items.

39. A method as recited in claim 35, comprising a further step of presenting user dialogs in response to application program requests for data items, the user dialogs allowing the current computer user to specify passwords to be used to decrypt data items.

40. A method as recited in claim 35, wherein the encrypting step is based on one or more keys that are derived from authentication of the current computer user.

41. A method as recited in claim 35, wherein the encrypting step is based on one or more keys that are derived from a user-supplied code.

42. A method as recited in claim 35, wherein the encrypting step is based on one or more keys that are derived from a computer logon code supplied by the current computer user.

43. A computer-readable storage medium comprising computerexecutable instructions that implement interface methods, the interface methods performing respective functions comprising:

opening a specified data item;
closing a specified data item;
creating a data item type;
deleting a data item type;
creating a data item subtype;
deleting a data item subtype;
deleting a data item;
retrieving a structure that corresponds to a specified data item subtype;
retrieving a structure that corresponds to a specified data item type;

establishing an access rule set for a specified data item subtype;

returning an access rule set for a specified data item subtype;

returning a specified data item;

writing a specified data item with a specified name as a specified data item type and data item subtype.

44. A computer-readable storage medium as recited in claim 43, the interface methods performing a further respective function comprising:

enumerating available data protection providers.

45. A computer-readable storage medium as recited in claim 43, the interface methods performing flirter respective functions comprising:

enumerating types of data items maintained by a data protection provider;

enumerating subtypes of data items maintained by the data protection provider;

enumerating data items maintained by the data protection provider.

* * * * *

UNITED STATES PATENT AND TRADEMARK OFFICE
CERTIFICATE OF CORRECTION

PATENT NO.    : 6,272,631 B1
DATED         : August 7, 2001
INVENTOR(S)   : Thomlinson et al.

It is certified that error appears in the above-identified patent and that said Letters Patent is hereby corrected as shown below:

Column 1,
Line 14, change "Modem" to -- Modern --.

Column 3,
Line 60, change "verifing" to -- verifying --.

Column 8,
Line 54, change "configuration" to -- confirmation --.

Column 9,
Line 30, change "Decryptions" to -- Decryption --.

Column 10,
Line 20, delete "is".

Column 12,
Line 34, change "necessarynly" to -- necessary only --.
Line 66, change "immediatly" to -- immediately --.

Column 83,
Line 24, change "flurther" to -- further --.

Column 85,
Line 6, delete "Is".

Column 88,
Line 14, change "subtvpe" to -- subtype --.

UNITED STATES PATENT AND TRADEMARK OFFICE
CERTIFICATE OF CORRECTION

PATENT NO. : 6,272,631 B1
DATED : August 7, 2001
INVENTOR(S) : Thomlinson et al.

It is certified that error appears in the above-identified patent and that said Letters Patent is hereby corrected as shown below:

Column 90,
Line 2, change "flirter" to -- further --.

Signed and Sealed this

Twenty-sixth Day of February, 2002

Attest:

Attesting Officer

JAMES E. ROGAN
Director of the United States Patent and Trademark Office